(12) United States Patent
Eiger et al.

(10) Patent No.: US 7,463,892 B2
(45) Date of Patent: Dec. 9, 2008

(54) LATENCY-AWARE SERVICE OPPORTUNITY WINDOW-BASED (LASO) SCHEDULING

(75) Inventors: Martin Eiger, Montville, NJ (US); Moncef Elaoud, Lake Hopatcong, NJ (US); Raquel Morera, Morristown, NJ (US)

(73) Assignees: Toshiba America Research, Inc., Piscataway, NJ (US); Telcordia Research Associates Inc., Piscataway, NJ (US)

( * ) Notice: Subject to any disclaimer, the term of this patent is extended or adjusted under 35 U.S.C. 154(b) by 334 days.

(21) Appl. No.: 11/161,709

(22) Filed: Aug. 12, 2005

(65) Prior Publication Data

US 2007/0036116 A1    Feb. 15, 2007

(51) Int. Cl.
*H04L 12/28* (2006.01)
*H04L 12/56* (2006.01)
(52) U.S. Cl. .................. 455/452.2; 370/395.4; 370/349
(58) Field of Classification Search .................. 370/230, 370/230.1, 238, 238.1, 346, 395.4, 395.41, 370/395.42, 395.43
See application file for complete search history.

(56) References Cited

U.S. PATENT DOCUMENTS 5,548,824 A * 8/1996 Inubushi et al. .......... 455/575.1
6,094,566 A * 7/2000 Dasent et al. ............ 455/575.6
6,961,311 B2 * 11/2005 Rakotoarivelo et al. ..... 370/238

OTHER PUBLICATIONS

Antonio Grilo, Mario Macedo, and Mario Nunes, INESC/IST: A Scheduling Algorithm for QoS Support in IEEE802.11E Networks, Jun. 2003, IEEE Wireless Comuunications, pp. 36 to 43.*

Norival R.Figueiria and Joseph Pasquale, A Schedulability Condition for Deadline-Ordered Disciplines, IEEE/ACM Transactions on Networking, vol. 5, No. 2, Apr. 1997.*

* cited by examiner

*Primary Examiner*—Nick Corsaro
*Assistant Examiner*—Vladimir Magloire
(74) *Attorney, Agent, or Firm*—Watchstone P&D, pllc; Stephen B. Parker

(57) ABSTRACT

Traffic flows of data packets from respective packet queues in wireless stations to a shared transmission medium of a wireless network are scheduled in accordance with Hybrid Controlled Channel Access (HCCA) and Enhanced Distributed Channel Access (EDCA). HCCA is applied by eliminating from consideration for HCCA access flows for which the sum of a desired minimum age of an oldest data packet in the respective packet queue and the time of creation of the oldest data packet is greater than the present time. For flows that are not eliminated from consideration, HCCA access is granted to the flow having a smallest sum of the desired maximum age of the oldest data packet and the time of creation of the oldest data packet. When all traffic flows are eliminated from consideration for HCCA access, EDCA is applied so that traffic flows compete for access to the medium.

20 Claims, 16 Drawing Sheets

LATENCY-AWARE SERVICE OPPORTUNITY WINDOW-BASED (LASO) SCHEDULING

BACKGROUND

1. Field of the Invention

The present invention relates generally to wireless data networks, and specifically to scheduling access of traffic flows to the wireless communication medium.

2. Background of the Invention

Wireless local area networks (WLAN) are being used for convenient interconnection of portable computers to office data processing networks and to the Internet. Presently there is a desire to increase WLAN data throughput and quality of service in order to support applications such as voice over Internet Protocol (IP) telephony, and real-time video streaming. For example, the Institute of Electrical and Electronics Engineers (IEEE) of Washington, D.C., is promulgating a standard 802.11 n for WLAN to provide data throughputs of at least 100 Mbit/sec.

One way of increasing the WLAN data throughput while providing an acceptable quality of service is to use the bandwidth of the wireless transmission medium more efficiently. Because user stations in the WLAN share access to the wireless transmission medium, a considerable amount of the existing bandwidth is consumed in a process of coordinating access of the traffic flows to the wireless transmission medium. In general, the nature of the wireless transmission medium precludes user stations from being synchronized to the extent that interference between user stations is unlikely. Therefore, collision avoidance techniques are generally used in the access control process to the wireless transmission medium.

IEEE standard 802.11 e provides a framework to provide acceptable quality of service as perceived by traffic flows accessing the wireless channel. Traffic flows can be serviced using either of two medium access methods, depending on the flow's preference. The first access method, called Hybrid Coordination function Channel Access (HCCA), is polling based. In this first method, a Hybrid Coordination Function (HCF) grants transmission opportunities (TXOP) to all participating flows based on a schedule. The second access method, called Enhanced Distributed coordination Channel Access (EDCA), is contention-based, in which flows compete to access the channel. In this second method, flows transmit packets whenever they sense that the shared medium is idle for a sufficient period of time. The Hybrid Coordination Function determines when each HCCA flow gets a chance to transmit and when control is ceded to EDCA traffic.

IEEE standard 802.11 e does not specify a particular method that the HCF must use for selecting a participating flow to receive a next TXOP. There are a number of known methods that the HCF could use, such as Earliest Deadline First (EDF), and Weighted Round Robin (WRR).

EDF scheduling is usually used to schedule real-time events with deadline constraints. EDF schedules the event with the closest deadline. In the case of packet transmissions, EDF grants transmission to the packet whose deadline is the earliest WRR is a scheduling discipline that allocates access to traffic flows, in a round robin fashion. Each flow receives access to the channel proportional to the flow's assigned weight. Weights are generally assigned by the network administrator.

SUMMARY OF THE INVENTION

The present invention is directed to the problem of providing a scheduling method for traffic flows during the HCCA period in accordance with IEEE standard 802.11 e and the proposed 802.11 n. In particular, the goal of the scheduling method is to meet delay requirements (deadlines) of HCCA traffic flows, and maximize the amount of time provided for EDCA access. The scheduling method is also capable of adapting in real time to arrivals and departures of traffic flows.

In accordance with a first aspect, the invention provides a computer-implemented method of scheduling access of traffic flows of data packets from respective packet queues for the traffic flows in wireless stations to the wireless transmission medium of a wireless network in which the stations share access to the wireless transmission medium. The method includes, for each of the traffic flows, obtaining a desired minimum age of an oldest data packet in the respective packet queue, obtaining a desired maximum age of the oldest data packet in the respective packet queue, and obtaining or estimating a time of creation of the oldest data packet in the respective packet queue. The method further includes eliminating from consideration for immediate access to the wireless transmission medium traffic flows for which the sum of the desired minimum age of the oldest data packet in the respective packet queue and the time of creation of the oldest data packet in the respective packet queue is greater than the present time. Moreover, for traffic flows that are not eliminated from consideration for immediate access to the wireless transmission medium, the method includes granting access to the wireless transmission medium to the traffic flow having the smallest sum of the desired maximum age of the oldest data packet in the respective packet queue and the time of creation of the oldest data packet in the respective packet queue.

Moreover, when all HCCA traffic flows are eliminated from consideration for access to the wireless transmission medium, the method applies EDCA so that traffic flows compete for access to the wireless transmission medium.

In accordance with another aspect, the invention provides an access point station for a wireless network having a number of user stations sharing access to a wireless transmission medium. The access point station includes a network interface for linking the access point station to a wireline network, a wireless transceiver for wireless communication with the user stations, and at least one processor programmed for scheduling access of traffic flows of data packets from respective packet queues for the traffic flows in the wireless stations to the wireless transmission medium in accordance with Hybrid Controlled Channel Access (HCCA) and Enhanced Distributed Channel Access (EDCA). At least one processor is programmed for applying HCCA by eliminating from consideration for HCCA access to the wireless transmission medium traffic flows for which the sum of a desired minimum age of an oldest data packet in the respective packet queue and the time of creation of the oldest data packet in the respective packet queue is greater than the present time, and for traffic flows that are not eliminated from consideration for HCCA access to the wireless transmission medium, granting HCCA access to the wireless transmission medium to the traffic flow having a smallest sum of the desired maximum age of the oldest data packet in the respective packet queue and the time of creation of the oldest data packet in the respective packet queue. At least one processor is also programmed so that when all traffic flows are eliminated from consideration for HCCA access to the wireless transmission medium, EDCA is applied so that traffic flows compete for access to the wireless transmission medium.

BRIEF DESCRIPTION OF THE DRAWINGS

Additional features and advantages of the invention will be described below with reference to the drawings, in which.

Figure 1:
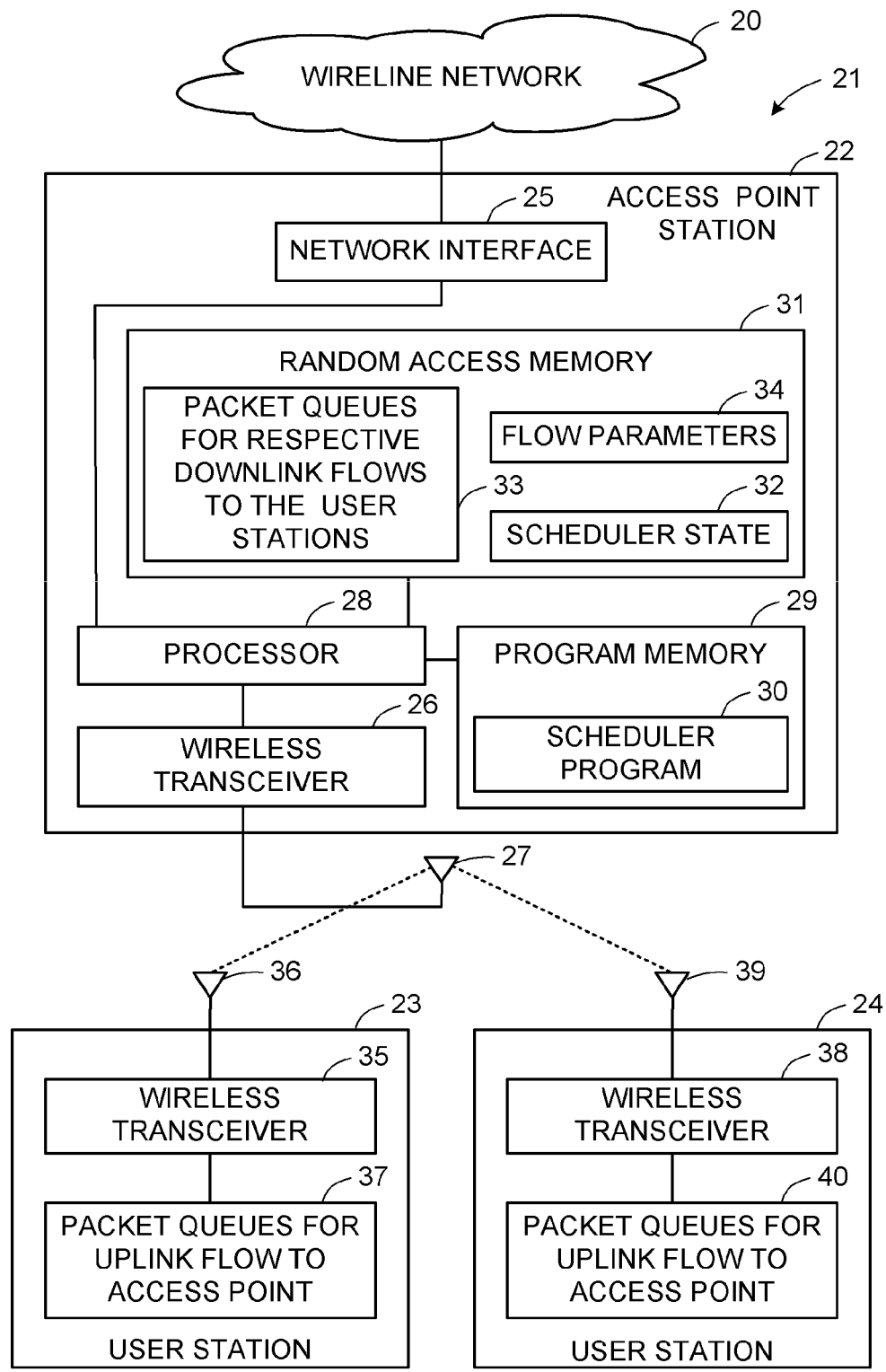
FIG. 1 is a block diagram of a WLAN incorporating the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a wireline network 20 connected to a wireless local area network (WLAN) generally designated 21. The WLAN 21 includes an access point station (AP) 22, and a number of user stations 23, 24. For example, the wireline network 20 is the Internet or a corporate data processing network, the access point station 22 is a wireless router, and the user stations 23, 24 are portable computers or portable voice-over-IP telephones.

The access point station 22 has a network interface 25 linked to the wireline network 21, and a wireless transceiver in communication with the user stations 23, 24. For example, the wireless transceiver 26 has an antenna 27 for radio or microwave frequency communication with the user stations 23, 25. The access point station 22 also has a processor 28, a program memory 29 containing a scheduler program 30, and a random access memory 31. The random access memory 31 contains state information 31 of the scheduler program, packet queues 33 including a respective packet queue for a respective downlink flow to each user station, and flow parameters 34.

The user station 23 has a wireless transceiver 35 including an antenna or an array of antennas 36 for communication with the access point station 22. The user station also includes several packet queues 36 for uplink flows to the access point station or to other stations. In a similar fashion, the user station 24 has a wireless transceiver 38, an antenna or an array of antennas 39, and several packet queues 40 for uplink flow to the access point station 22 or other stations.

The present invention more particularly concerns the scheduler program 30. The input to a scheduler program is a set of traffic flows, each of which represents a unidirectional flow between a station 23, 24 and the AP 22 or between two user stations 23, 24. Bidirectional flows can be represented as two traffic flows, one in each of the up flow and down flow directions. Each HCCA traffic flow ($F_m$) has several attributes, including a delay constraint ($\delta_m$) that is the maximum tolerable packet delay, a mean bit-generation rate ($R_m$), and a mean packet size ($S_m$). It is assumed that EDCA traffic has no delay constraints.

The scheduler program 30 determines which HCCA traffic flow should transmit at any given time, as well as the length of each granted transmission opportunity (TXOP). It also determines when control should be relinquished to EDCA traffic, and for how long. Overall, the scheduler program should meet delay requirements (deadlines) of HCCA traffic flows, and maximize the amount of time provided for EDCA access. In practice, the scheduler program also should be capable of adapting in real time to arrivals and departures of traffic flows.

During development of the scheduler program 30, Earliest Deadline First (EDF) and Weighted Round Robin (WRR) were considered as possible scheduling methods for selecting a traffic flow to be granted a TXOP. In an attempt to adapt EDF for use with HCCA, the AP kept track, for each traffic flow, of the time that the most recent TXOP ended. To obtain an upper bound on experienced delay, it was assumed that a new packet of flow $F_m$ arrives as soon as a transmission opportunity of the same flow ends at time $t_{me}$. To satisfy delay requirements of all packets in the flow, the flow must be serviced no later than $t_{me}+\delta_m$.

When a TXOP ends at time t, EDF grants access to the traffic flow whose last end time+delay is earliest. That is, EDF grants access to flow $F_i$ such that:

$$F_i = \underset{F_m \in F}{\arg\min}(t_m + \delta_m)$$

The amount of time granted to that TXOP is large, with the intention that the corresponding queue be emptied during the TXOP.

Performance results using this adaptation of EDF were poor. This can best be explained with an example. Consider two traffic flows, voice with a delay of 30 ms and video with a delay of 200 ms. The scheduler would grant TXOPs repeatedly to voice for 170 ms, because its last end time plus delay is earlier than video's for that duration of time. For many of those TXOPs, no voice packets are available. Then after 170 ms, a TXOP is given to video. During the 170 ms, several packets have accumulated. By the time transmission of those video packets is complete, the oldest voice packets will have missed their deadlines.

In an attempt to adapt WRR to HCCA, time was segmented into slots whose duration was half of the smallest delay requirement over all HCCA traffic flows in the system. Within each time slot, each traffic flow was granted a TXOP, on a round-robin basis. If a complete round-robin cycle terminated before the end of the slot, then the remaining time in the slot was made available to EDCA. In addition, it could be specified that every kth slot, for some user-specified integer k, would be used exclusively EDCA.

This adaptation of WRR could ensure that delay requirements were met, as long as the aggregate load fits within a time slot. The interval of time between two successive TXOPs for any traffic flow is at most two times a slot length (assuming an intervening EDCA slot); this service interval is equal to the most stringent delay.

However, this adaptation of WRR provided inefficient aggregation of packets. Traffic flows whose delay threshold is larger than the most stringent delay requirement are granted TXOPs as often as every other traffic flow. Less frequent granting of TXOPs to those traffic flows could still satisfy their delay requirements while affording better aggregation of packets into transmission blocks. This motivated development of a preferred method of Enhanced Earliest Deadline First (Latency-Aware Service Opportunity Window-based (LASO)) scheduling.

Enhanced Earliest Deadline First (Latency-Aware Service Opportunity Window-based (LASO)) scheduling for HCCA attempts to collect enough packets from each flow to aggregate the packets efficiently, without collecting so many packets that some packets miss their deadlines. In contrast, the above adaptations of EDF and WRR were driven by deadlines but failed to aggregate packets efficiently, necessitating extra HCCA overhead that reduced the time available to EDCA.

Latency-Aware Service Opportunity Window-based (LASO) scheduling is designed to adapt to a fluctuating traffic load and mix using information that is already available to the access point station 22. A user station 23, 24 that desires to participate in the HCCA period provides the AP with the traffic specification of its flow $F_m$. The provided information includes the average bit-arrival rate $R_m$, the average packet size $S_m$, and the delay requirement $\delta_m$ of the flow. This information is used by the AP to develop its HCCA schedule. Since the delay budget $\delta_m$ is allocated for the wireless hops, it may be assumed, without loss of generality, that a packet is created at the time it arrives at the medium access control (MAC) packet queues 33, 37, 40. Then, for each flow $F_m$, $t_{cm}$ is defined to be the creation time of the packet at the head of its queue. Assuming first-in, first-out (FIFO) queues, the packet at the head of each queue is the oldest packet in the queue. Now, assume that the AP knows the creation time $t_{cm}$ of the oldest packet of each flow $F_m$. To meet the deadline requirements of each traffic flow, each flow $F_m$ must receive a transmission opportunity at time t where $$t \leq t_{cm} + \delta_m$$

If this equation is not satisfied, the oldest packet will miss its deadline. However, if t in this equation is too small as compared to $(t_{cm}+\delta_m)$, that is, if the AP gives TXOPs too early, the aggregation of packets will be inefficient.

In the Latency-Aware Service Opportunity Window-based (LASO) method, each traffic flow $F_m$ is characterized by two parameters, $minage_m$ and $maxage_m$. These are the minimum and maximum ages, respectively, that the oldest packet in a traffic flow should reach when the AP grants it a TXOP. That is, a flow $F_m$ is serviced no earlier than the time where its oldest packet is $minage_m$ old and should be serviced no later than the time where its oldest packet is $maxage_m$ old. Clearly $manage \leq maxage$ in all cases. manage should be large to ensure efficient aggregation, and maxage should be large to grant the AP flexibility in scheduling the TXOPs. But neither should be so large that they risk scheduling TXOPs too late for packets to make their deadlines.

Typically, maxage should be made slightly less than the actual deadline, and manage should be made large enough to collect a number of packets equal to the smaller of two values: either the maximum number of packets in a block, or the expected number of packets that collect in a delay period, rounded down to the nearest integer.

When a TXOP ends, the access point should determine which traffic flow to grant the next TXOP to. Three values for each traffic flow are used in this calculation: $t_{cm}$ (periodically reset, as described below), $minage_m$, and $maxage_m$. $t_{cm}+minage_m$ is the earliest that a traffic flow should get a TXOP, and $t_{cm}+maxage_m$ is the latest.

Figure 2:
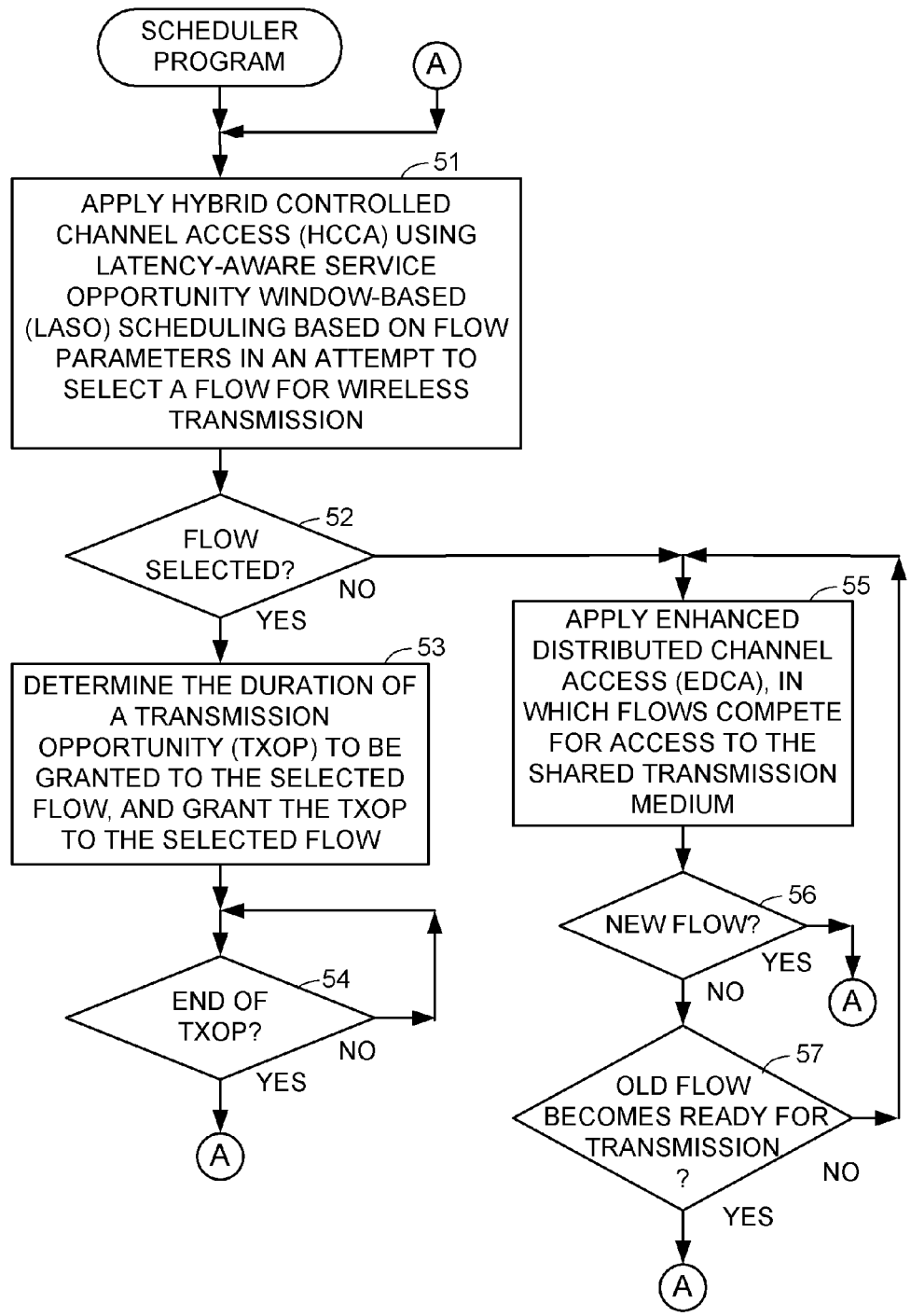
FIG. 2 is a flowchart of a scheduler program used in the access point (AP) of the WLAN of FIG. 1.

FIG. 2 shows a flowchart of the scheduler program using Latency-Aware Service Opportunity Window-based (LASO). In a first step 51, the AP applies HCCA using Latency-Aware Service Opportunity Window-based (LASO) based on the flow parameters in an attempt to select a flow for wireless transmission. All traffic flows for which $t_{cm}+minage_m$ is some time in the future are eliminated from consideration for immediate access. From among the traffic flows that remain, the one whose $t_{cm}+maxage_m$ is the smallest is granted the TXOP. In step 52, if a flow was selected by HCCA (in step 51), then execution continues to step 53. In step 53, the AP determines the duration of a transmission opportunity (TXOP) to be granted to the selected flow, and the AP grants this TXOP to the selected flow. In step 54, once sufficient time has elapsed to reach the end of the TXOP, execution loops back to step 51.

In step 52, if no flow was selected by the HCCA scheduler (in step 51), then execution branches from step 52 to step 55. In step 55, the AP applies EDCA, in which flows compete for access to the shared transmission medium. In other words, if there is no transmission flow found in step 51 for which $t_{cm}+minage_m$ has yet occurred, HCCA suspends itself and EDCA runs in step 55. EDCA runs until a new traffic flow is found in step 56 to enter the system, or an old flow becomes ready for transmission (when the current time reaches $t_{cm}+minage_m$), whichever happens first. Once a new flow enters the system, execution loops from step 56 back to step 51 to resume HCCA. Once an old flow becomes ready for transmission, execution loop from step 57 back to step 51 to resume HCCA.

Figure 3:
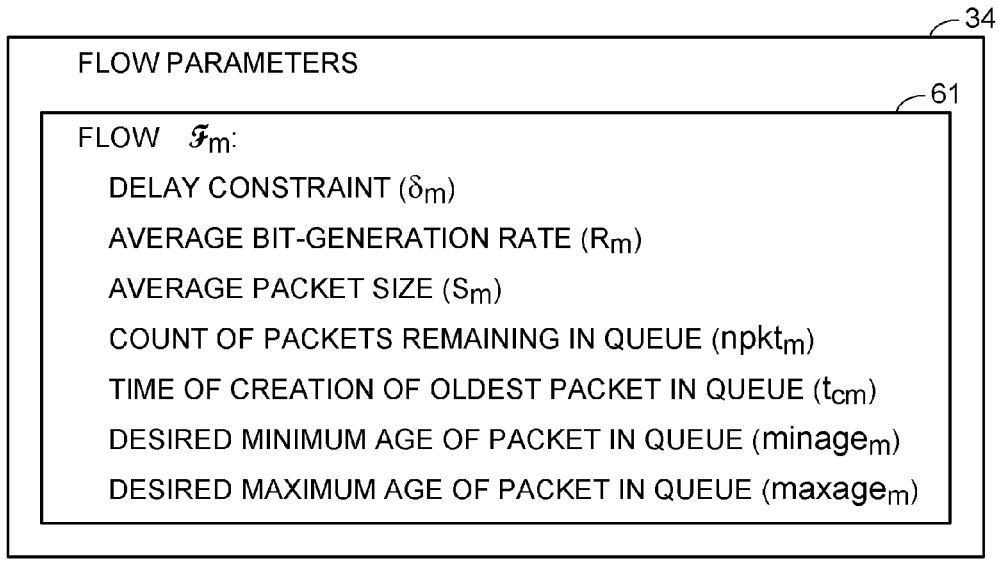
FIG. 3 is a block diagram showing flow parameters stored in memory of the AP of the WLAN of FIG. 1.

FIG. 3 shows the various flow parameters used by the scheduler program. In addition to the flow attributes $\delta_m$, $R_m$, and $S_m$, the flow parameters include a count ($npkt_m$) of packets remaining in the packet queue for the flow, the time of creation ($t_{cm}$) of the oldest packet in the queue, the desired minimum age ($minage_m$) of any packet in the packet queue for the flow, and the desired maximum age ($maxage_m$) of any packet in the packet queue for the flow. These flow parameters are used for HCCA and Latency-Aware Service Opportunity Window-based (LASO) scheduling as shown in FIG. 4.

Figure 4:
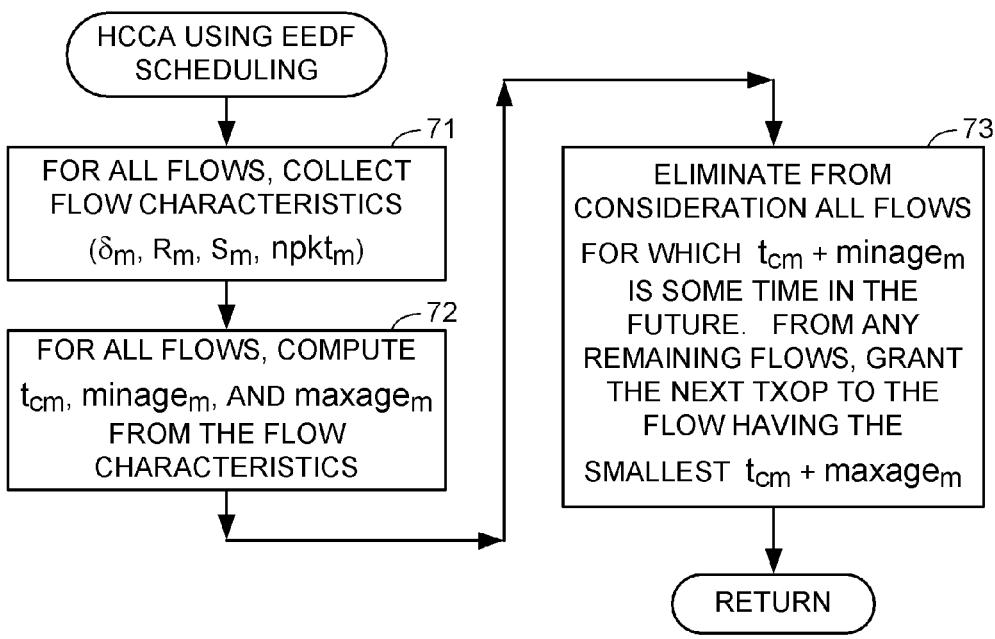
FIG. 4 is a flowchart of a HCCA routine used in the scheduler program of FIG. 2.

FIG. 4 shows the HCCA routine used in step 51 of the scheduler program of FIG. 2. In a first step 71 of FIG. 4, the AP collects flow characteristics ($\delta_m$, $R_m$, $S_m$, and $npkt_m$) for all of the flows. In step 72, the AP computes $t_{cm}$, $minage_m$, and $maxage_m$ for all flows. In step 73, the AP eliminates from consideration all flows for which $t_{cm}+minage_m$ is some time in the future. From any remaining flows, the AP grants the next TXOP to the flow having the smallest $t_{cm}+maxage_m$.

Figure 5:
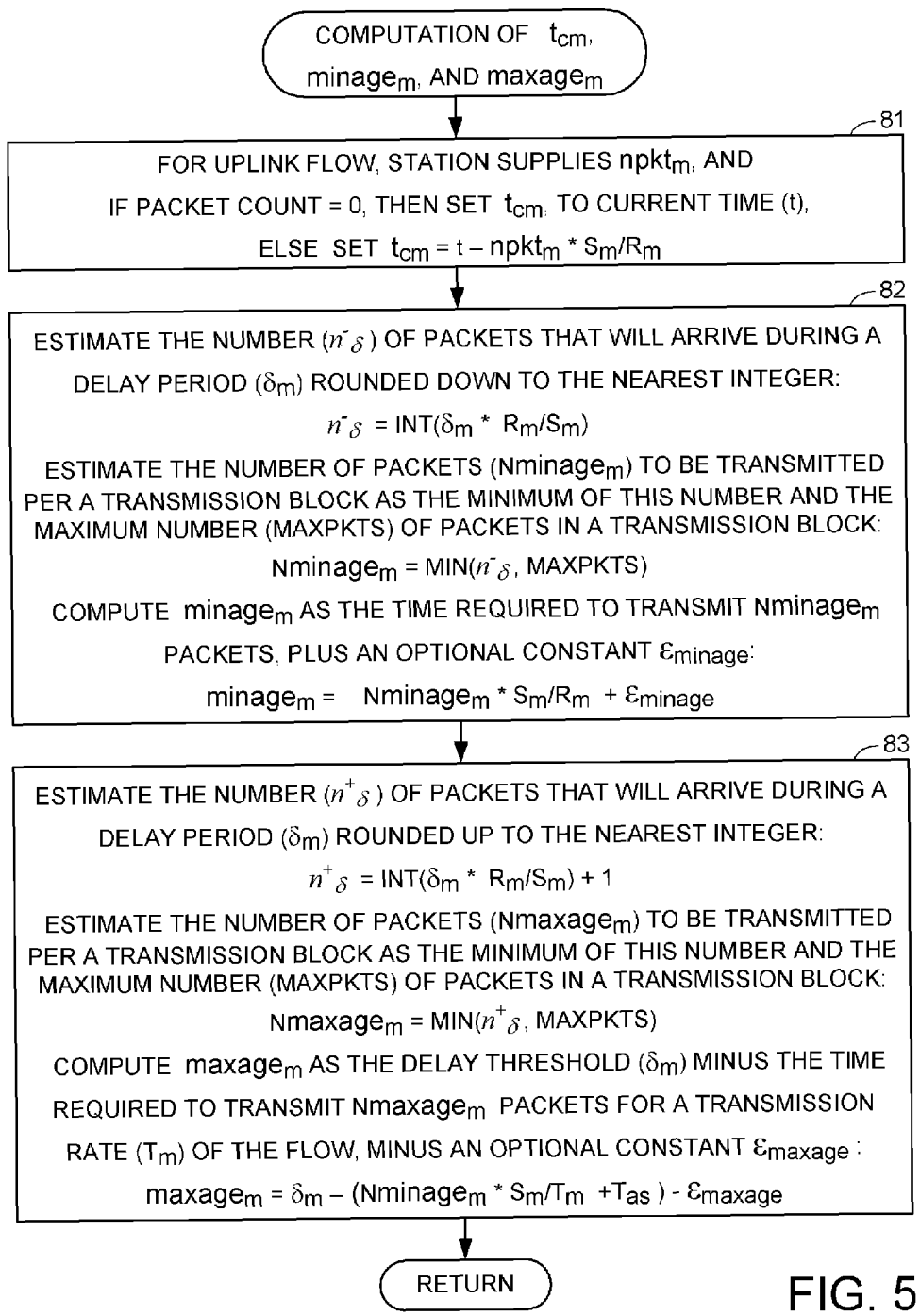
FIG. 5 is a flowchart of a routine used in the scheduler program of FIG. 2 for computing certain flow parameters.

FIG. 5 shows how the scheduler computes $t_{cm}$, $minage_m$, and $maxage_m$ for each flow. In step 81, the AP determines a creation time ($t_{cm}$) for each flow. This is the age of the oldest packet for each traffic flow. The creation time can be estimated from a packet count. The IEEE 802.11 standard provides for packet counts to be included in packet transmissions. So for downlink traffic flows, the access point can record the number of packets in the corresponding one of the queues (33 in FIG. 1). For uplink traffic flows, the sending user station can piggyback a packet count onto all data, null, and block ack request packets.

Every time the access point sees a packet count, either upon transmitting a packet on a downlink traffic flow or receiving a packet on an uplink traffic flow, the AP estimates the creation time of the oldest packet remaining in the queue. If the packet count is 0, the creation time is assumed to be the present time. If it is a positive number, the count is multiplied by the average packet inter-arrival rate and subtracted from the current time to produce an estimate of the creation time of the oldest packet.

On the uplink, packet counts piggybacked onto packets is the only information that the station passes to the AP for estimating tc. Therefore, this method for estimating tc uses all information available to the access point. On the downlink, however, the queues are collocated at the access point with the scheduler. Because of this, incorporate additional information may be incorporated into the assessment of the creation time of the oldest packet for a downlink flow.

There are at least three alternative methods by which the scheduler can compute tc for downlink traffic flows. First, tc is computed as described above, based on packet counts when the AP transmits application data packets and block ack requests. This method puts downlink traffic flows on equal footing with uplink traffic flows. Second, tc is computed based on packet counts, but not the packet counts at the time that downlink packets are transmitted. Instead, when the scheduler is evaluating which traffic flow to grant the next TXOP, more up-do-date packet counts are applied for all downlink traffic flows in the system. Third, the scheduler uses explicit creation times of the oldest packet on each downlink queue. In an actual system, this information might not be available, but it is available for simulation and can therefore be used for benchmarking purposes.

In short, as shown in step 81 of FIG. 5, for each uplink flow, the station supplies to the AP a value for the packet count $npkt_m$. For each downlink flow, the AP obtains the packet count $npkt_m$ directly from its packet queues (33 in FIG. 1). If the packet count $npkt_m$ is zero, then the AP sets $t_{cm}$ to the current time (t). Otherwise, the AP sets $t_{cm}$ to $t-npkt_m*S_m/R_m$.

In step 82, the AP computes $minage_m$. There are at least two methods that could be used for specifying manage and maxage. In a first method, they are independent of delay requirements, and they are provided explicitly for each HCCA traffic class and inherited by each traffic flow from the corresponding class. However, the values that are provided explicitly for each HCCA traffic class should incorporate delay requirements in their derivation. In a second method, manage and maxage are computed automatically from delay requirements.

To compute manage for a given traffic flow, the traffic flow's mean packet arrival rate is used to estimate the number of packets $n^-_\delta$ that will arrive during a delay period, rounded down to the nearest integer. Set Nminage equal to the minimum of $n^-_\delta$ and the maximum number of packets in a transmission block (taken to be 64 packets in simulations). Then, manage is computed as the time required to generate Nminage packets. An optional constant, $\epsilon_{minage}$, can be added to produce manage; this increases the likelihood of better aggregation, by forcing more time between successive TXOPs for a given traffic flow, at the potential cost of missing deadlines.

As shown in step 82 of FIG. 5, the AP estimates the number ($n^-_\delta$) of packets that will arrive during a delay period ($\delta_m$) rounded down to the nearest integer. The AP sets $n^-_\delta$ equal to $INT(\delta_m*R_m/S_m)$. Then the AP estimates the number of packets ($Nminage_m$) to be transmitted per transmission block as the minimum of this number and the maximum number (MAXPKTS) of packets in a transmission block. The AP sets $Nminage_m=MIN(n^-_\delta, MAXPKTS)$. The AP computes $minage_m$ as the time required to generate $Nminage_m$ packets plus an optional constant $\epsilon_{minage}$. The AP sets $minage_m$ equal to $Nminage_m*S_m/R_m+\epsilon_{minage}$.

In step 83, the AP computes $maxage_m$. The computation of maxage is similar to the computation of minage. Again, the number of packets in a delay period is used, now rounded up to the nearest integer, $n^+_\delta$. Nmaxage is set to the minimum of $n^+_\delta$ and the maximum number of packets in a transmission block. Then, maxage is set to the delay threshold minus the amount of time needed to transmit Nmaxage packets, minus an optional constant $\epsilon_{maxage}$. Higher values of $\epsilon_{maxage}$ increase the assurance that packets will make their deadlines, but they can result in less time between successive TXOPs for a given traffic flow and thus less efficient aggregation. The computation of maxage depends on the amount of time to send Nmaxage packets, and thus transmission rates. Because different nodes transmit at different rates, the resulting maxage values can differ, even within a class of service.

As shown in step 83 of FIG. 5, the AP estimates the number ($n^+_\delta$) of packets that will arrive during a delay period ($\delta_m$) rounded up to the nearest integer. For example, the AP sets $n^+_\delta$ equal to $INT(\delta_m*R_m/S_m)+1$. Then the AP estimates the number of packets ($Nmaxage_m$) to be transmitted per transmission block as the minimum of this number and the maximum number (MAXPKTS) of packets in a transmission block. The AP sets $Nmaxage_m=MIN(n^+_\delta, MAXPKTS)$. The AP computes $maxage_m$ as the delay threshold ($\delta_m$) minus the time required to transmit $Nminage_m$ packets minus an optional constant $\epsilon_{maxage}$. The AP sets $maxage_m$ equal to $\delta_m-(Nminage_m*S_m/T_m+T_{as})-\epsilon maxage$, where $T_m$ is the transmission rate of the flow, and $T_{as}$ is an additional amount of time to send the set of packets. The additional amount of time $T_{as}$ to send the set of packets includes time for polls (if appropriate), block acknowledgement requests, block acknowledgements, delimiters (if appropriate), and interframe spacing.

Figure 6:
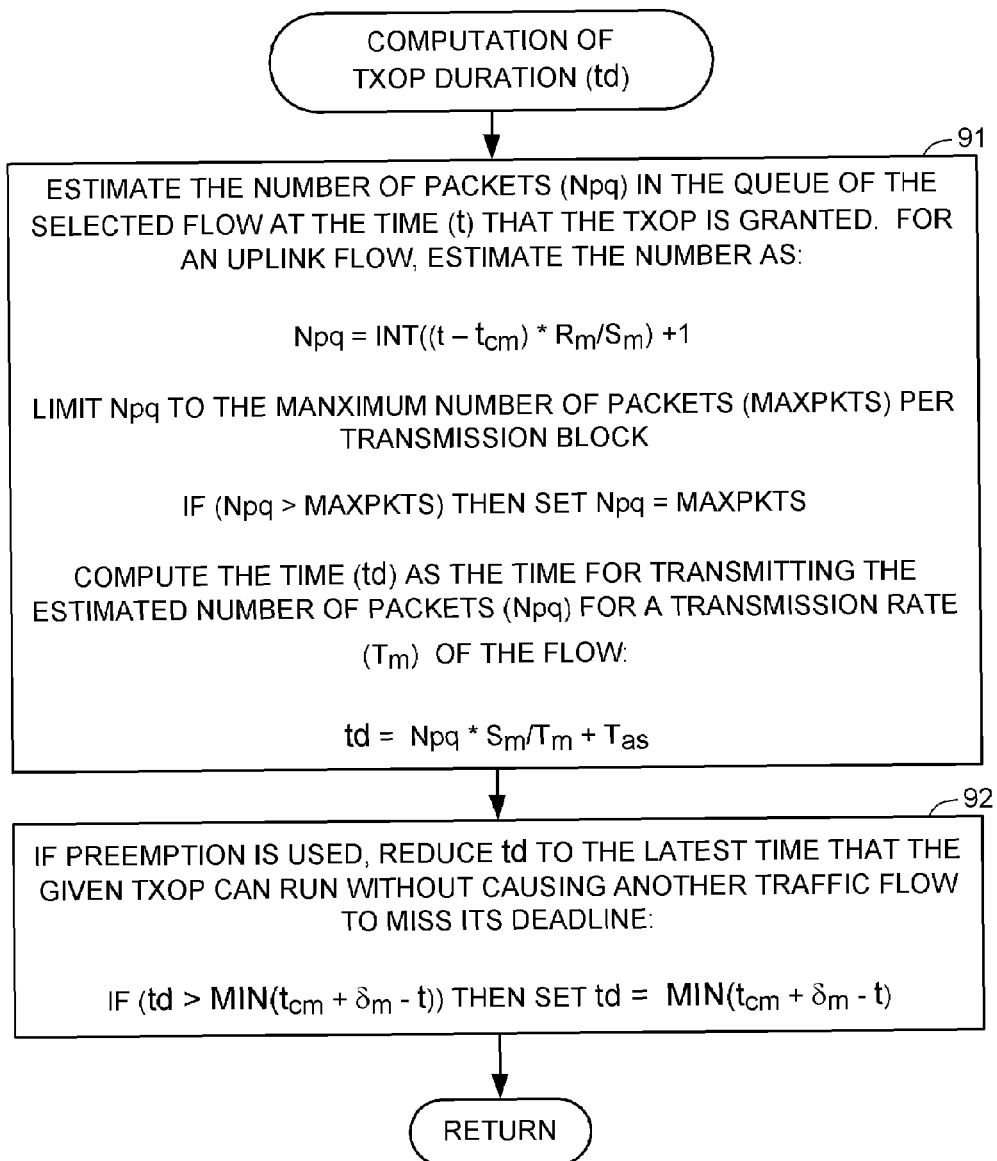
FIG. 6 is a flowchart of a routine used in the scheduler program of FIG. 2 for computing the duration of a TXOP.

FIG. 6 is a flowchart of a routine used in the scheduler program of FIG. 2 for computing the duration (td) of a TXOP in step 53 of FIG. 2. The baseline duration of the TXOP is based on the number of packets believed to be in the queue for the selected flow at the time that the TXOP is granted. The number of packets in the queue is computed as the difference between the current time and the estimated creation time of the oldest packet in the queue (tc, as defined above), divided by the mean packet arrival rate. This number is rounded up to the nearest integer, and the time granted for the TXOP is the amount of time required to transmit this number of packets.

Simulation indicates that more packets make their deadlines if the TXOPs are limited to at most one transmission block of packets. Allowing more than one block within a single TXOP does not increase aggregation efficiency, and it can result in arbitrarily long TXOPs, starving other traffic flows for bandwidth and causing their packets to miss their deadlines.

As shown in a first step 91 of FIG. 6, the AP estimates the number of packets (Npq) in the queue of the selected flow at the time (t) that the TXOP is granted. For an uplink flow, the AP estimates the number as:

$Npq = INT((t - t_{cm}) * R_m / S_m) + 1$

To limit Npq to the maximum number of packets (MAXPKTS) per transmission block, the AP compares Npq to MAXPKTS and if Npq is greater than MAXPKTS, then the AP sets Npq equal to MAXPKTS. The AP computes the time (td) as the duration of time required for transmitting the estimated number of packets (Npq) as $td = Npq * S_m / T_m + T_{as}$, where $T_{as}$ is an additional amount of time to send the set of packets. The additional amount of time $T_{as}$ includes time for polls (if appropriate), block acknowledgement requests, block acknowledgements, delimiters (if appropriate), and interframe spacing.

The duration of the TXOP can also be limited by preemption. If two or more traffic flows have imminent tc+maxage times, the one with the earlier tc+maxage will still be granted the first TXOP, but the other traffic flows can curtail its allotment of time, in an attempt to keep themselves from missing their deadlines.

If preemption is used, the duration of a TXOP is computed based on the number of packets estimated to be in the queue or a provided upper bound such as the maximum number of packets in a transmission block, as described above. Then for each other traffic flow or for combinations of other traffic flows, the scheduler computes the latest the given TXOP can run without causing another traffic flow to miss its deadline, and reduces the amount of time granted to the TXOP if necessary.

Preemption impacts only the time granted to TXOPs, and never the traffic flow to which the next TXOP is granted at any given time. If the TXOP duration is reduced to 0, as can happen with severe congestion, the traffic flow to which the TXOP is granted still sends one packet, if available, before the access point schedules the next TXOP.

As shown in step 92 of FIG. 6, if preemption is used, the AP reduces td to the latest time that the given TXOP can run without causing another traffic flow to miss its deadline. In other words, the AP computes the deadlines $t_{cm} + \delta_m - t$ for the other flows, and finds the minimum deadline. If td is greater than this minimum deadline, then the AP sets td equal to this minimum deadline.

Figure 7:
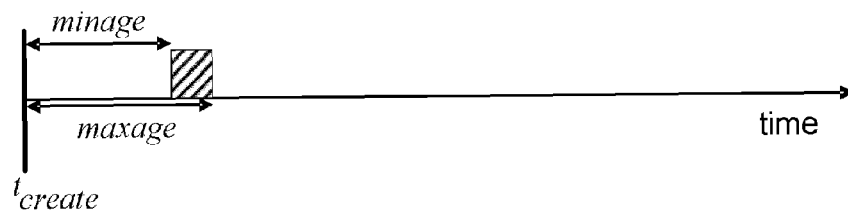
FIGS. 7 to 11 are timing diagrams showing operation of the scheduler program of FIG. 2 for scheduling a single traffic flow over an interval of time.

FIGS. 7 to 11 show operation of the scheduler program of FIG. 2 for scheduling a single traffic flow. In FIG. 7, the traffic flow enters the system. The scheduler sets tc to the arrival time, and it computes tc+manage and tc+maxage to determine when the next TXOP for this traffic stream should begin. tc+manage is a time in the future, so no TXOP is granted and access is ceded to EDCA.

Figure 8:
Figure 9:
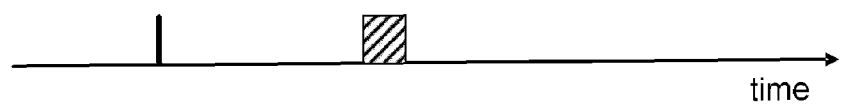
Figure 10:
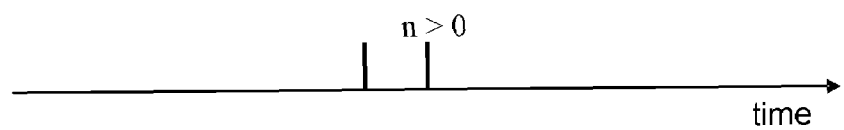
Figure 11:
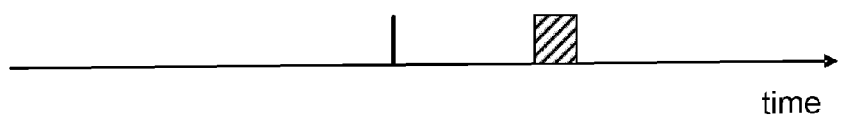

When time tc+manage arrives, shown in FIG. 8, a TXOP is granted. Whenever the TXOP ends, the transmitting station conveys a count of packets remaining in its queue in the last packet it sends (this is part of IEEE 802.11 e/n draft standard). In this example, the packet count was 0, so tc is reset to the present time. A new TXOP window is computed, as shown in cross-hatch in FIG. 9. Because this also begins in the future, access is given to EDCA.

In FIG. 10, again the traffic flow is granted a TXOP at the beginning of its window (because there are no competing HCCA flows to delay it). In this example, however, packets remain in the queue at the end of the TXOP. In this case, tc is computed to be some time in the past, specifically, the number of packets remaining in the queue multiplied by the average packet arrival rate, subtracted from the present time. The process repeats in FIG. 11, but with less time until the TXOP window begins.

Figure 12:
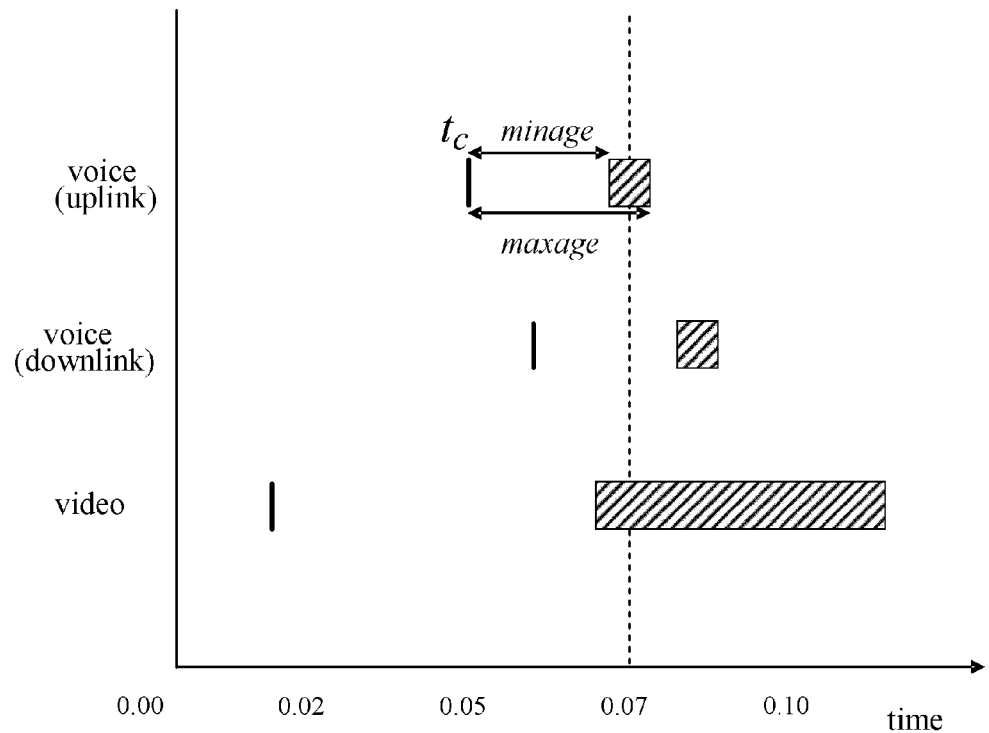
FIG. 12 is a timing diagram showing operation of the scheduler program of FIG. 2 for scheduling concurrent traffic flows at a single point in time.

FIG. 12 shows the scheduler program of FIG. 2 scheduling concurrent traffic flows. The flows having respective parameters shown in Table 1 below.

TABLE 1

Concurrent flows

| Traffic Flow | $t_{cm}$ | minage | maxage |
| --- | --- | --- | --- |
| $F_1$: voice (uplink) | 0:00.050 | 22 ms | 28 ms |
| $F_2$: voice (downlink) | 0:00.060 | 22 ms | 28 ms |
| $F_3$: video | 0:00.020 | 50 ms | 95 ms |

At time 0:00.075, the access point is evaluating which of three traffic flows to grant the next TXOP. For each traffic flow, tc+minage and tc+maxage are computed, defining a window of time during which the scheduler will begin that traffic flow's next TXOP. In this example, the downlink voice is ineligible at 0:00.075 because its window has not yet begun. Of the other two flows, uplink voice's window ends earlier, so it is granted the next TXOP. The fact that the window for video began earlier than the window for uplink voice does not matter.

When the transmission opportunity for uplink voice completes, a new tc will be computed, based on the packet count transmitted with the last packet. The next TXOP will be determined based on the new tc+minage and tc+maxage for uplink voice, along with tc+minage and tc+maxage for downlink voice and for video, which will not have changed during the TXOP for uplink voice.

If the access point were evaluating the next TXOP at time 0:00.065 instead of 10 ms later, the result would be different. In this case, no traffic flow's window would have yet begun, so the scheduler would allow EDCA to run until the first traffic flow's window began, which in this case is video at 0:00.070. Then video would get the next TXOP, since neither voice flow's window would have yet begun.

Simulation based on data models was used to evaluate the HCCA/Latency-Aware Service Opportunity Window-based (LASO) scheduler. The performance of a scheduling scheme, however, should not be tied to specific traffic source characteristics. For example, a pure round robin scheduling scheme may work very well with Constant Bit Rate (CBR) traffic, but as the serving quantum per source increases, it can have very poor performance with real time bursty traffic due to lack of adaptation. Since data applications in general are far from being constant bit rate, a VBR source model was developed for the simulations. A generic video source model was not found that satisfied the simulation requirements. Thus, based on some already proposed video models, the following on-off model for UDP traffic was developed. Sources have on and off periods. During the on periods they transmit data traffic and during the off periods they are silent, i.e. do not generate any traffic. During the on-period, the source generates a burst of bits. The number of bits generated during each period ton is a random number that follows a negative exponential distribution, e-λb, where λ is the average and b is the number of bits. The on periods occur at periodic intervals, ton. If a source generation rate is G bps, then λ=R*ton Each simulated source has a constant packet size S, therefore, the number of packets generated between two on intervals follows a negative exponential distribution and has a mean of λ/S. In the simulator, it is assumed that all packets, within each flow, are of the same length so every time a number of bits is drawn from the negative exponential distribution, the number of packets is rounded up to the nearest integer, i.e.

$$Num\ packets\ generated = \left\lceil \frac{b_i}{S} \right\rceil$$

Figure 13:
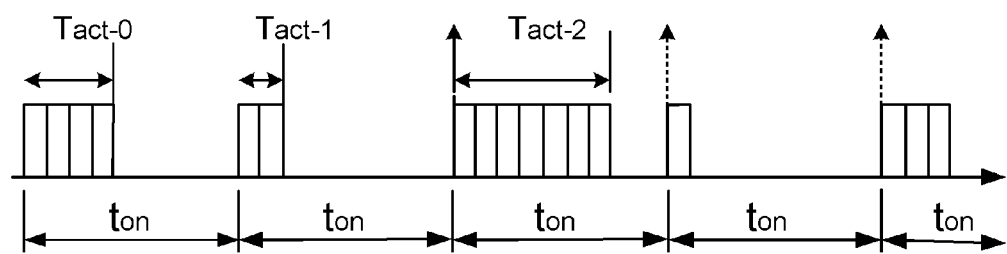
FIG. 13 is a timing diagram of a User Datagram Protocol (UDP) traffic source model.

FIG. 13 shows the VBR source distribution, where Tact-i represents the time needed to transmit the number of packets generated during the ith on period.

Simulations for voice used concurrent bi-directional voice sessions, each connecting a wireless end user and a wireline end user through an IEEE802.11 access point (though the wireline end user is not explicitly simulated). The voice generation model is based on the ITU-T Recommendation P.59 voice generation model. This voice generation model defines four states: mutual silence, single talk M, single talk S, and double talk. It provides statistical distributions for the holding time in each state, as well as transition probabilities among states. The holding times in each state are exponentially distributed with average holding times shown Table 2 below.

TABLE 2

Average Holding Time for Voice Model

|  | Average Holding Time in Milliseconds |
|---|---|
| Single Talk | 0.854 |
| Double Talk | 0.226 |
| Mutual Silence | 0.456 |

Operation of the HCCA/Latency-Aware Service Opportunity Window-based (LASO) scheduler was simulated for three different scenarios designated as SS1, SS4 and SS6 for both 20 and the 40 MHz cases. Simulations were run for five different seeds. The results shown in FIGS. 14 to 25 are the average over all seeds. The simulation parameters are shown in Table 4, and Table 5 below.

TABLE 3

SS1 scenario simulation parameters

| From | To | Class | Service | δ | R (Mbps) | S (Bytes) | Tx Rate 20 MHz (Mbps) | Tx Rate 40 MHz (Mbps) |
|---|---|---|---|---|---|---|---|---|
| AP | STA 1 | EDCA | TCP | N/A | 1 | 1000 | 126 | 162 |
| STA 2 | AP | EDCA | TCP | N/A | 30 | 1000 | 72 | 54 |
| STA 3 | AP | HCCA1 | UDP | 16 | 0.5 | 50 | 126 | 216 |
| STA 4 | AP | HCCA2 | Voice | 30 | 0.096 | 120 | 54 | 54 |
| AP | STA 4 | HCCA2 | Voice | 30 | 0.096 | 120 | 54 | 54 |
| STA 5 | AP | HCCA2 | Voice | 30 | 0.096 | 120 | 54 | 54 |
| AP | STA 5 | HCCA2 | Voice | 30 | 0.096 | 120 | 54 | 54 |
| STA 6 | AP | HCCA2 | Voice | 30 | 0.096 | 120 | 54 | 54 |
| AP | STA 6 | HCCA2 | Voice | 30 | 0.096 | 120 | 54 | 54 |
| STA 7 | AP | HCCA3 | UDP | 50 | 1 | 512 | 96 | 108 |
| STA 8 | AP | HCCA4 | UDP | 100 | 0.060 | 64 | 126 | 243 |
| STA 9 | AP | HCCA4 | UDP | 100 | 0.060 | 64 | 126 | 243 |
| STA 10 | AP | HCCA5 | UDP | 100 | 0.5 | 512 | 54 | 54 |
| STA 11 | AP | HCCA5 | UDP | 100 | 0.5 | 512 | 54 | 54 |
| AP | STA 12 | HCCA6 | UDP | 200 | 0.128 | 418 | 108 | 162 |
| AP | STA 13 | HCCA7 | UDP | 200 | 2 | 512 | 96 | 108 |
| AP | STA 14 | HCCA8 | UDP | 200 | 4 | 1500 | 126 | 162 |
| AP | STA 15 | HCCA9 | UDP | 200 | 19.2 | 1500 | 126 | 243 |
| AP | STA 16 | HCCA10 | UDP | 200 | 24 | 1500 | 126 | 243 |

TABLE 4

SS4 scenario simulation parameters

| From | To | Class | Service | δ | R (Mbps) | S (Bytes) | Tx Rate 20 MHz (Mbps) | Tx Rate 40 MHz (Mbps) |
|---|---|---|---|---|---|---|---|---|
| AP | STA 1 | EDCA | TCP | N/A | 1 | 1000 | 126 | 243 |
| AP | STA 2 | EDCA | TCP | N/A | 1 | 1000 | 126 | 243 |
| AP | STA 3 | EDCA | TCP | N/A | 1 | 1000 | 126 | 243 |
| AP | STA 4 | EDCA | TCP | N/A | 1 | 1000 | 126 | 243 |
| AP | STA 5 | EDCA | TCP | N/A | 1 | 1000 | 126 | 243 |
| AP | STA 6 | EDCA | TCP | N/A | 10 | 1000 | 126 | 243 |
| AP | STA 7 | EDCA | TCP | N/A | 30 | 1000 | 126 | 243 |
| AP | STA 8 | EDCA | TCP | N/A | 30 | 1000 | 126 | 243 |
| AP | STA 9 | EDCA | TCP | N/A | 30 | 1000 | 126 | 243 |
| AP | STA 10 | EDCA | TCP | N/A | 30 | 1000 | 126 | 243 |
| AP | STA 11 | EDCA | TCP | N/A | 30 | 1000 | 126 | 243 |
| AP | STA 12 | EDCA | TCP | N/A | 30 | 1000 | 126 | 243 |
| AP | STA 13 | EDCA | TCP | N/A | 30 | 1000 | 126 | 243 |
| AP | STA 14 | EDCA | TCP | N/A | 30 | 1000 | 126 | 243 |
| AP | STA 15 | EDCA | TCP | N/A | 30 | 1000 | 126 | 243 |
| AP | STA 16 | EDCA | TCP | N/A | 30 | 1000 | 126 | 243 |
| STA 17 | AP | EDCA | TCP | N/A | 0.256 | 1000 | 126 | 243 |
| STA 18 | AP | EDCA | TCP | N/A | 0.256 | 1000 | 126 | 243 |
| STA 19 | AP | EDCA | TCP | N/A | 0.256 | 1000 | 126 | 243 |
| STA 20 | AP | EDCA | TCP | N/A | 0.256 | 1000 | 126 | 243 |
| STA 21 | AP | EDCA | TCP | N/A | 5 | 1000 | 126 | 243 |
| STA 22 | AP | EDCA | TCP | N/A | 10 | 1000 | 126 | 243 |
| STA 23 | AP | EDCA | TCP | N/A | 30 | 1000 | 126 | 243 |
| STA 24 | AP | EDCA | TCP | N/A | 30 | 1000 | 126 | 243 |
| STA 25 | AP | EDCA | TCP | N/A | 30 | 1000 | 126 | 243 |
| STA 26 | AP | EDCA | TCP | N/A | 30 | 1000 | 126 | 243 |
| AP | STA 27 | HCCA2 | UDP | 100 | 1 | 512 | 126 | 243 |
| AP | STA 28 | HCCA2 | UDP | 100 | 1 | 512 | 126 | 243 |
| AP | STA 29 | HCCA3 | UDP | 200 | 2 | 512 | 126 | 243 |
| AP | STA 30 | HCCA3 | UDP | 200 | 2 | 512 | 126 | 243 |
| STA 31 | AP | HCCA1 | Voice | 30 | 0.096 | 120 | 54 | 54 |
| STA 32 | AP | HCCA1 | Voice | 30 | 0.096 | 120 | 54 | 54 |
| STA 33 | AP | HCCA1 | Voice | 30 | 0.096 | 120 | 54 | 54 |
| STA 34 | AP | HCCA1 | Voice | 30 | 0.096 | 120 | 54 | 54 |
| STA 35 | AP | HCCA1 | Voice | 30 | 0.096 | 120 | 54 | 54 |
| STA 36 | AP | HCCA1 | Voice | 30 | 0.096 | 120 | 54 | 54 |
| AP | STA 31 | HCCA1 | Voice | 30 | 0.096 | 120 | 54 | 54 |
| AP | STA 32 | HCCA1 | Voice | 30 | 0.096 | 120 | 54 | 54 |
| AP | STA 33 | HCCA1 | Voice | 30 | 0.096 | 120 | 54 | 54 |
| AP | STA 34 | HCCA1 | Voice | 30 | 0.096 | 120 | 54 | 54 |
| AP | STA 35 | HCCA1 | Voice | 30 | 0.096 | 120 | 54 | 54 |
| AP | STA 36 | HCCA1 | Voice | 30 | 0.096 | 120 | 54 | 54 |
| STA 37 | AP | HCCA2 | UDP | 100 | 1 | 512 | 126 | 243 |
| STA 38 | AP | HCCA2 | UDP | 100 | 1 | 512 | 126 | 243 |

TABLE 5

SS6 scenario simulation parameters

| From | To | Class | Service | δ | R (Mbps) | S (Bytes) | Tx Rate 20 MHz (Mbps) | Tx Rate 40 MHz (Mbps) |
|---|---|---|---|---|---|---|---|---|
| AP | STA 1 | EDCA | TCP | | 2 | 1000 | 108 | 108 |
| AP | STA 2 | EDCA | TCP | | 2 | 1000 | 108 | 108 |
| AP | STA 3 | EDCA | TCP | | 2 | 1000 | 108 | 108 |
| AP | STA 4 | EDCA | TCP | | 2 | 1000 | 108 | 108 |
| AP | STA 5 | EDCA | TCP | | 2 | 1000 | 108 | 108 |
| AP | STA 6 | EDCA | TCP | | 2 | 1000 | 108 | 108 |
| AP | STA 7 | EDCA | TCP | | 2 | 1000 | 108 | 108 |
| AP | STA 8 | EDCA | TCP | | 2 | 1000 | 108 | 108 |
| AP | STA 9 | EDCA | TCP | | 2 | 1000 | 108 | 108 |
| AP | STA 10 | EDCA | TCP | | 2 | 1000 | 108 | 108 |
| AP | STA 11 | HCCA1 | Voice | 30 | 0.096 | 120 | 54 | 54 |
| AP | STA 12 | HCCA1 | Voice | 30 | 0.096 | 120 | 54 | 54 |
| AP | STA 13 | HCCA1 | Voice | 30 | 0.096 | 120 | 54 | 54 |
| AP | STA 14 | HCCA1 | Voice | 30 | 0.096 | 120 | 54 | 54 |
| AP | STA 15 | HCCA1 | Voice | 30 | 0.096 | 120 | 54 | 54 |

TABLE 5-continued

SS6 scenario simulation parameters

| From | To | Class | Service | δ | R (Mbps) | S (Bytes) | Tx Rate 20 MHz (Mbps) | Tx Rate 40 MHz (Mbps) |
|---|---|---|---|---|---|---|---|---|
| AP | STA 16 | HCCA1 | Voice | 30 | 0.096 | 120 | 54 | 54 |
| AP | STA 17 | HCCA1 | Voice | 30 | 0.096 | 120 | 54 | 54 |
| AP | STA 18 | HCCA1 | Voice | 30 | 0.096 | 120 | 54 | 54 |
| AP | STA 19 | HCCA1 | Voice | 30 | 0.096 | 120 | 54 | 54 |
| AP | STA 20 | HCCA1 | Voice | 30 | 0.096 | 120 | 54 | 54 |
| AP | STA 21 | HCCA1 | Voice | 30 | 0.096 | 120 | 54 | 54 |
| AP | STA 22 | HCCA1 | Voice | 30 | 0.096 | 120 | 54 | 54 |
| AP | STA 23 | HCCA1 | Voice | 30 | 0.096 | 120 | 54 | 54 |
| AP | STA 24 | HCCA1 | Voice | 30 | 0.096 | 120 | 54 | 54 |
| AP | STA 25 | HCCA1 | Voice | 30 | 0.096 | 120 | 54 | 54 |
| STA 11 | AP | HCCA1 | Voice | 30 | 0.096 | 120 | 54 | 54 |
| STA 12 | AP | HCCA1 | Voice | 30 | 0.096 | 120 | 54 | 54 |
| STA 13 | AP | HCCA1 | Voice | 30 | 0.096 | 120 | 54 | 54 |
| STA 14 | AP | HCCA1 | Voice | 30 | 0.096 | 120 | 54 | 54 |
| STA 15 | AP | HCCA1 | Voice | 30 | 0.096 | 120 | 54 | 54 |
| STA 16 | AP | HCCA1 | Voice | 30 | 0.096 | 120 | 54 | 54 |
| STA 17 | AP | HCCA1 | Voice | 30 | 0.096 | 120 | 54 | 54 |
| STA 18 | AP | HCCA1 | Voice | 30 | 0.096 | 120 | 54 | 54 |
| STA 19 | AP | HCCA1 | Voice | 30 | 0.096 | 120 | 54 | 54 |
| STA 20 | AP | HCCA1 | Voice | 30 | 0.096 | 120 | 54 | 54 |
| STA 21 | AP | HCCA1 | Voice | 30 | 0.096 | 120 | 54 | 54 |
| STA 22 | AP | HCCA1 | Voice | 30 | 0.096 | 120 | 54 | 54 |
| STA 23 | AP | HCCA1 | Voice | 30 | 0.096 | 120 | 54 | 54 |
| STA 24 | AP | HCCA1 | Voice | 30 | 0.096 | 120 | 54 | 54 |
| STA 25 | AP | HCCA1 | Voice | 30 | 0.096 | 120 | 54 | 54 |
| AP | SAT 26 | HCCA2 | UDP | 200 | 2 | 512 | 108 | 162 |
| AP | SAT 27 | HCCA2 | UDP | 200 | 2 | 512 | 108 | 162 |
| AP | SAT 28 | HCCA2 | UDP | 200 | 2 | 512 | 108 | 162 |
| AP | SAT 29 | HCCA2 | UDP | 200 | 2 | 512 | 108 | 162 |
| AP | SAT 30 | HCCA3 | UDP | 200 | 5 | 1500 | 126 | 243 |
| AP | SAT 31 | HCCA3 | UDP | 200 | 5 | 1500 | 126 | 243 |
| AP | SAT 32 | HCCA4 | UDP | 200 | 8 | 512 | 108 | 216 |
| AP | SAT 33 | HCCA4 | UDP | 200 | 8 | 512 | 108 | 216 |
| AP | SAT 34 | HCCA4 | UDP | 200 | 8 | 512 | 108 | 216 |

A theoretical lower bound of time needed to transmit all of the HCCA traffic was calculated. Then the theoretical upper bound of time available to EDCA was obtained by subtracting the HCCA lower bound from the total time available. Then the time each flow requires to transmit all the traffic generated while maximizing aggregation was calculated. The process is as follows: (1) Compute the number of packets generated in a period equal to the delay constraint of that flow. For example, for voice traffic the number of voice packets generated in 30 ms is 3 (for 96 kbps and 120-byte packets). (2) Compare the computed block size with the maximum block size, i.e. 64. Since 3 is less than 64, it is assumed that the maximum size of a voice block is 3 packets, i.e. MAX_BLOCK is 3. For those flows that generate more than 64 packets in a period equal to the delay constraint, the maximum block size is set to 64. (3) Calculate the number of blocks of size MAX_BLOCK generated during the simulation time. (4) Calculate the time it takes to transmit a block taking into account: 11a preambles, 11n preambles (when needed), headers, SIFS, PIFS, polls, block acknowledgment request, block acknowledgement, delimiters, packet size (each flow has a different packet size) and transmission rates. (5) Multiply the number of blocks of MAX_BLOCK size generated within the simulation time by the time it takes to transmit each block. (6) Do the same for all flows and obtain the minimum percentage of the simulation time that must be dedicated to HCCA. (7) Subtract the number obtained in step (6) from 100% to obtain the theoretical maximum % of time that is available to EDCA traffic.

The upper bound on EDCA available time obtained here is a merely theoretical bound and it cannot be reached in any practical implementation. The reasons are: (a) for those flows that do not accumulate more than 64 packets in a delay interval, packet transmission delay is pushed to the limit, in a real scenario many packets would miss their deadline; (b) there is signaling traffic, such as NULL packets that are not taken into accounted in this calculation; and (c) there are some collisions in the channel for HCCA signaling messages that may result in a reduction in the available time to EDCA. Although not achievable, this bound is as a baseline for comparison of the scheduling schemes.

To measure the effectiveness of HCCA/Latency-Aware Service Opportunity Window-based (LASO) scheduling, simulation was used to monitor performance of real-time traffic flows and the time available to EDCA traffic. A good scheduling algorithm should meet the delay requirements of most of the real-time packets (98% for voice for example) while making as much time available to the EDCA traffic as possible. The amount of time available to EDCA is a measure of the aggregation level that the scheduling algorithm provides during the HCCA traffic transmission. The larger the available time to EDCA traffic the better the scheduling algorithm is in aggregating traffic during the HCCA traffic transmission.

Figure 14:
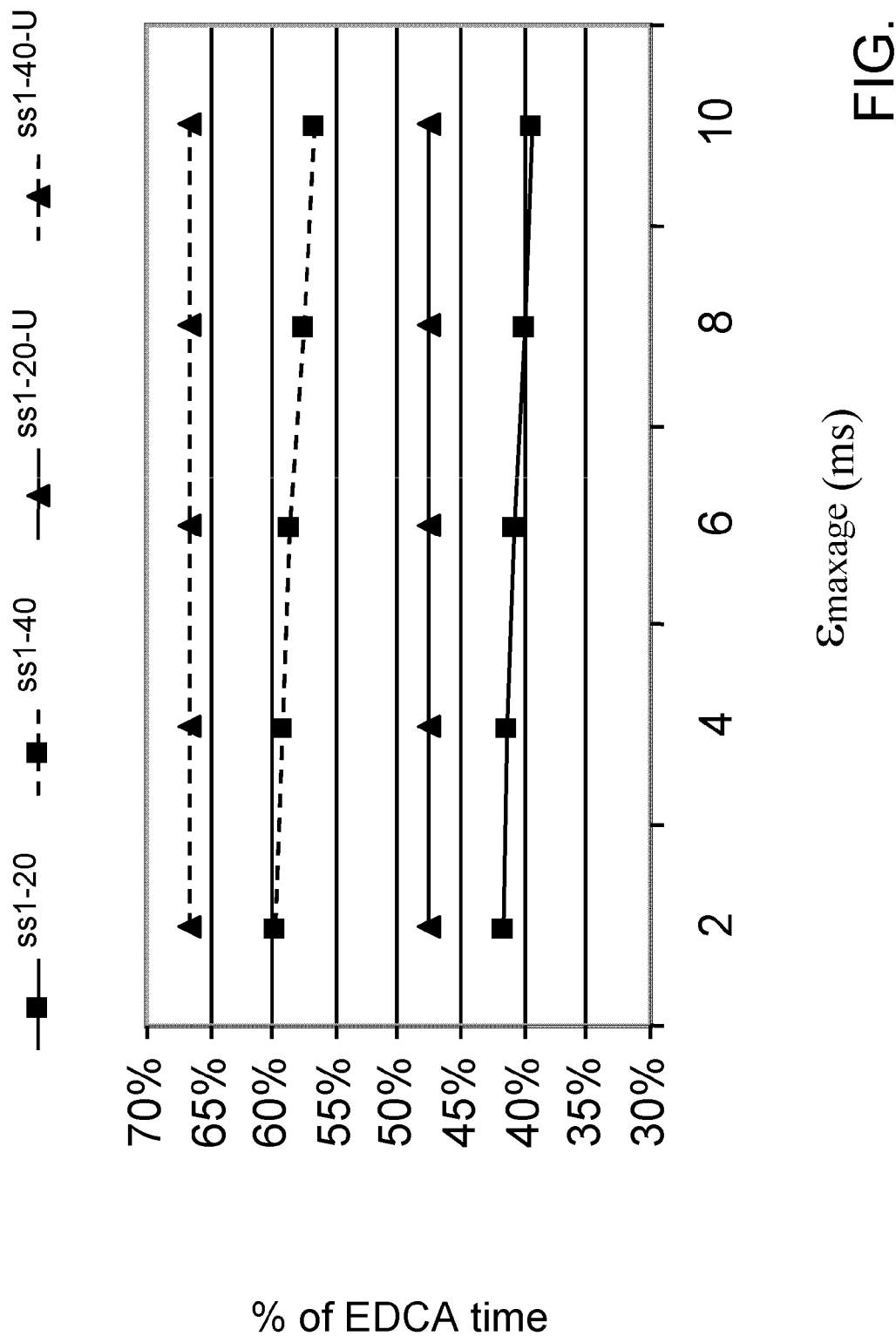
FIG. 14 shows results from a first set of simulations including the fraction of medium access time that the scheduler gives to EDCA as a function of an optional adjustable parameter.
Figure 15:
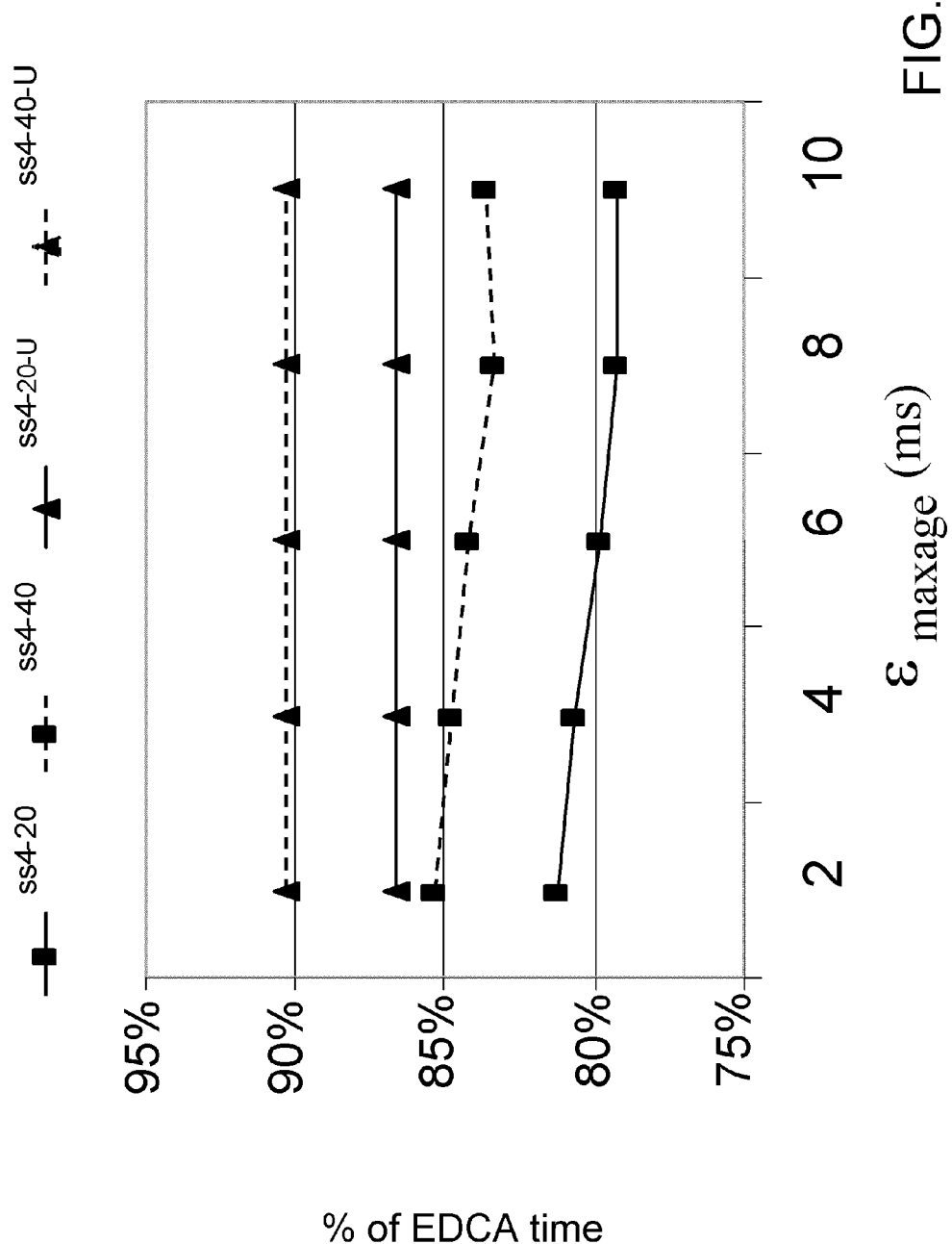
FIG. 15 shows results from a second set of simulations including the fraction of medium access time that the scheduler gives to EDCA as a function of an optional adjustable parameter.
Figure 16:
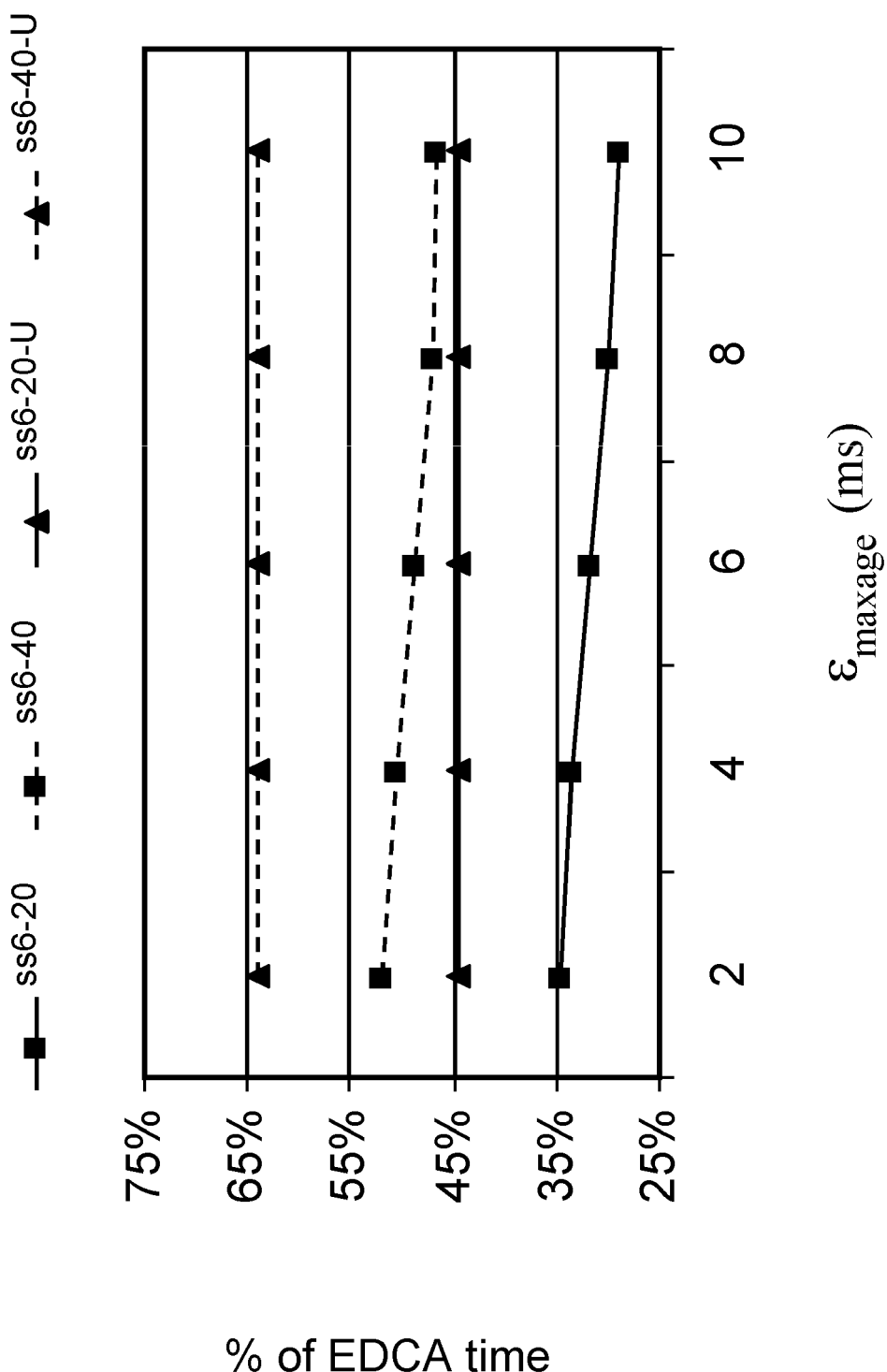
FIG. 16 shows results from a third set of simulations including the fraction of medium access time that the scheduler gives to EDCA as a function of an optional adjustable parameter.

FIGS. 14, 15, and 16 show the percentage of time available to EDCA for the SS1, SS4 and SS6 scenarios respectively and for the 20 MHz and 40 MHz case. For each scenario (6 total) there are two curves, the one represented with squares shows the simulation results and the curve plotted with triangles shows the theoretical upper bound computed as described above. The percentage of EDCA time is plotted against $\epsilon_{maxage}$. In all scenarios, the time available to EDCA slightly decreases with the increase of $\epsilon_{maxage}$. The larger the $\epsilon_{maxage}$ the smaller the aggregation of those flows that do not generate more than 64 packets in a delay interval, therefore, the larger the time needed to transmit HCCA traffic and the smaller the time available for EDCA traffic. The difference between the smallest and the largest percentage of time available to EDCA is less than 4% for SS1, around 2% for SS4 and 6% for SS6 for the $\epsilon_{maxage}$ shown in these figures. The difference in performance between the different scenarios is due to the fact that the load of HCCA traffic and the flow characteristics are different for each scenario. As expected, in all 6 cases, the simulation results give less time available to EDCA than the theoretical upper bound. For SS1 and SS4 simulation results are 5% away from the theoretical for small $\epsilon_{maxage}$ and 10% for higher values of $\epsilon_{maxage}$. For SS6 the difference is increased to 10% for lower $\epsilon_{maxage}$ to 20% for higher $\epsilon_{maxage}$.

Figure 17:
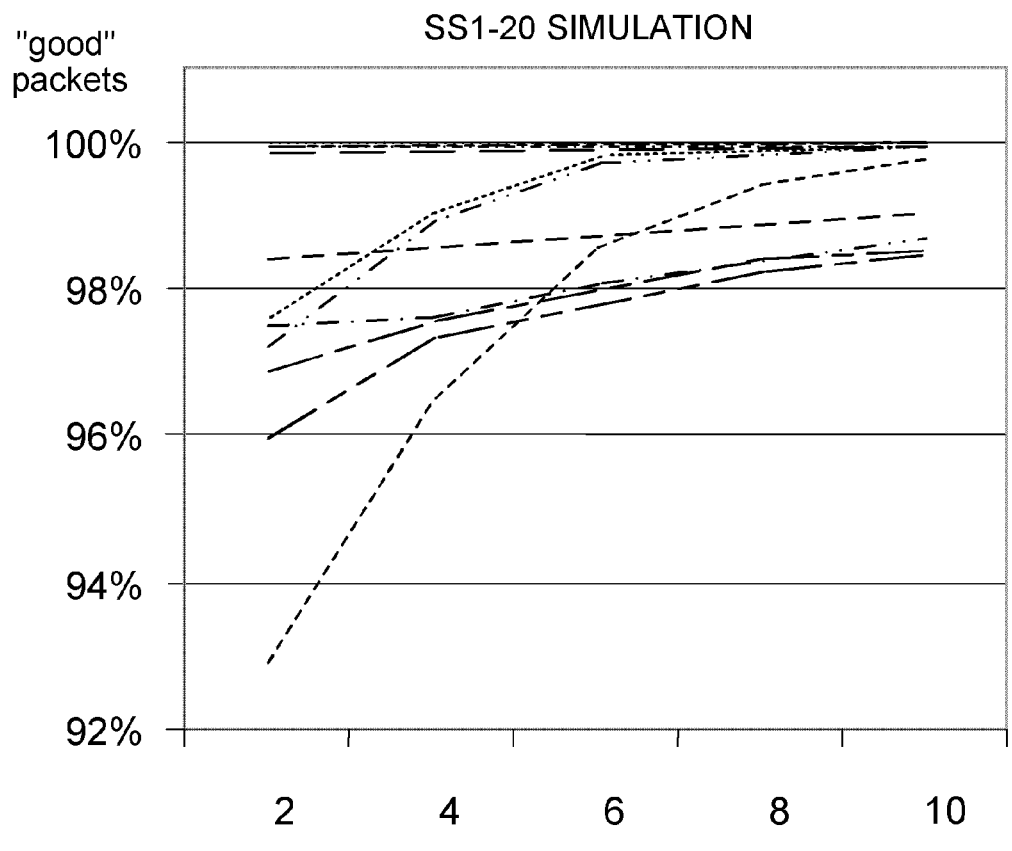
FIG. 17 shows the percentage of data packets that make their deadline requirements for one simulation in the first set of simulations of FIG. 14.
Figure 18:
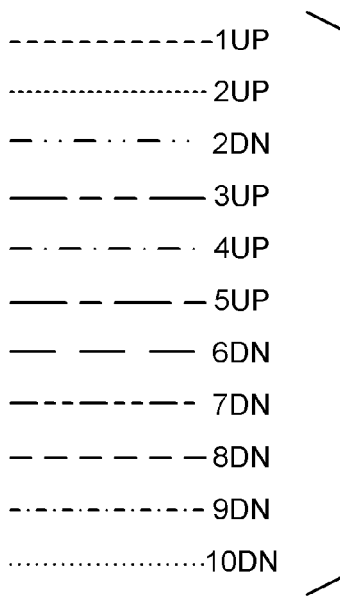
FIG. 18 identifies the various graphs in FIG. 17 and FIG. 19 in terms of uplink and downlink flows.
Figure 19:
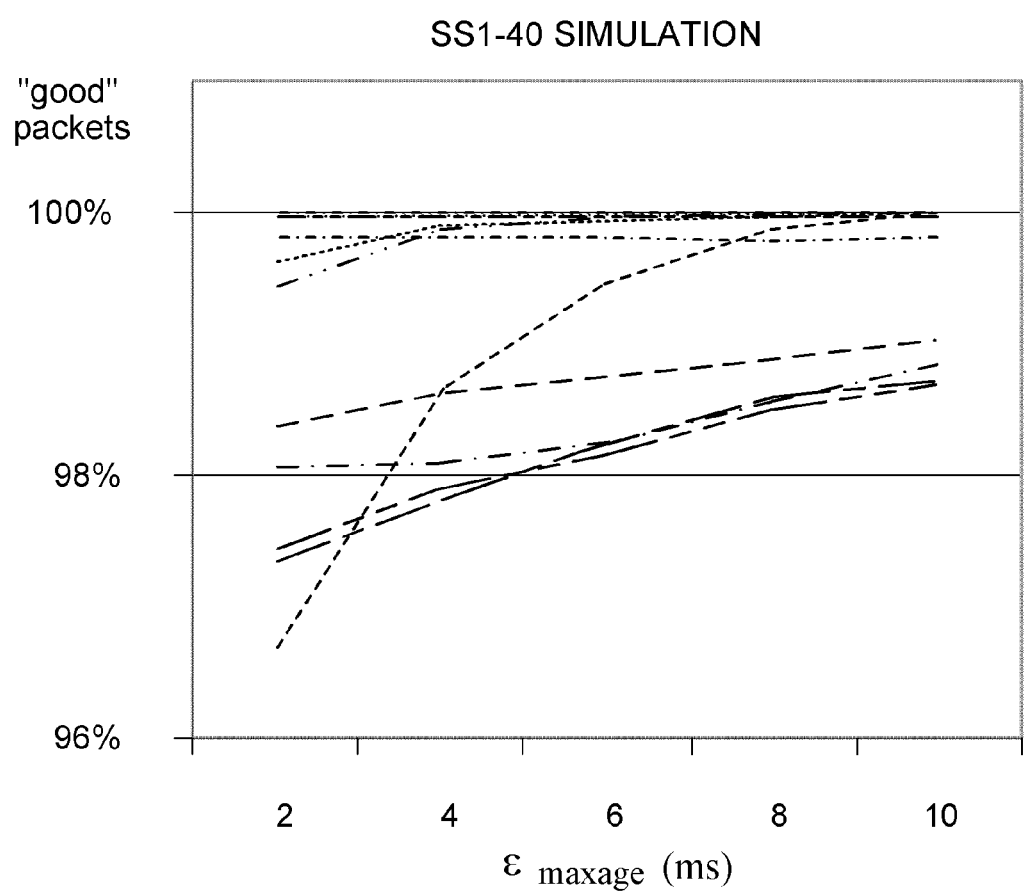
FIG. 19 shows the percentage of data packets that make their deadline requirements for another simulation in the first set of simulations of FIG. 14.
Figure 20:
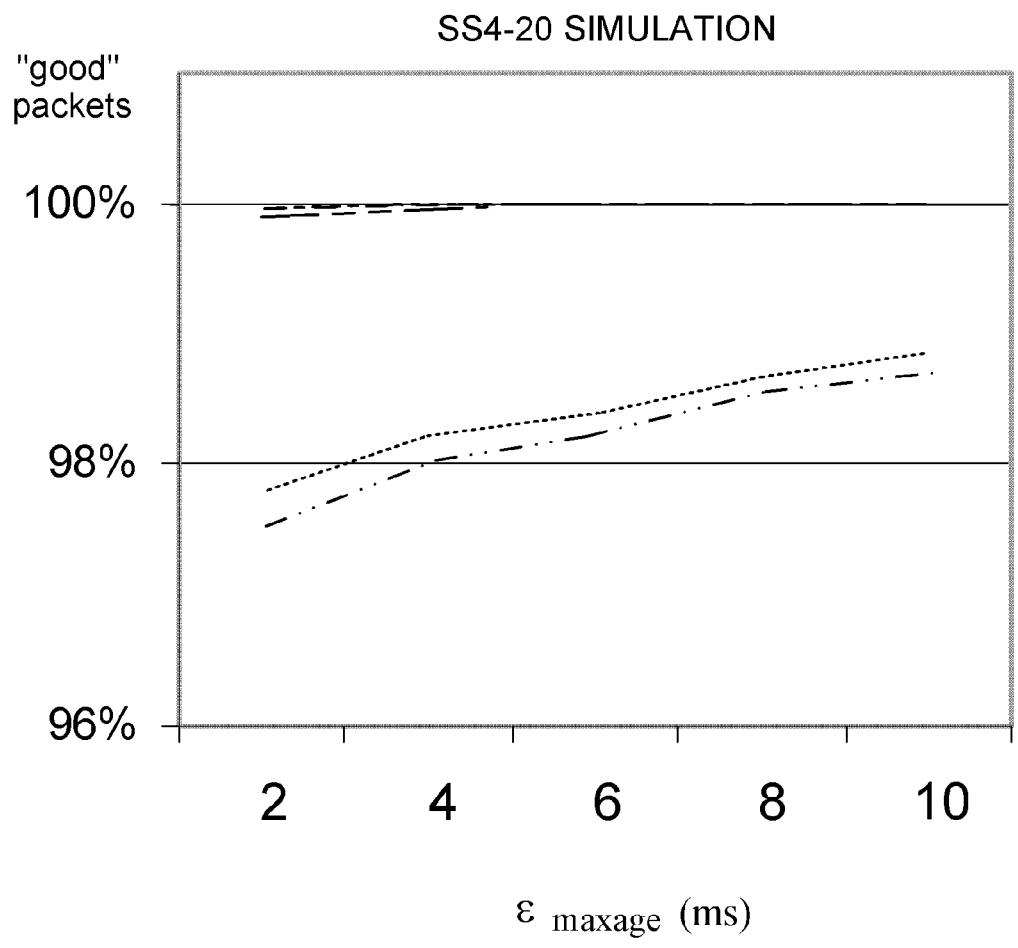
FIG. 20 shows the percentage of data packets that make their deadline requirements for one simulation in the second set of simulations of FIG. 15.
Figure 21:
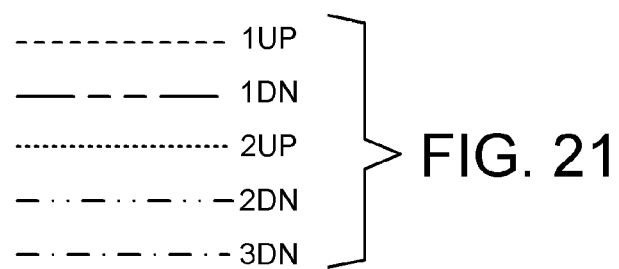
FIG. 21 identifies the various graphs in FIG. 20 and FIG. 22 in terms of uplink and downlink flows.
Figure 22:
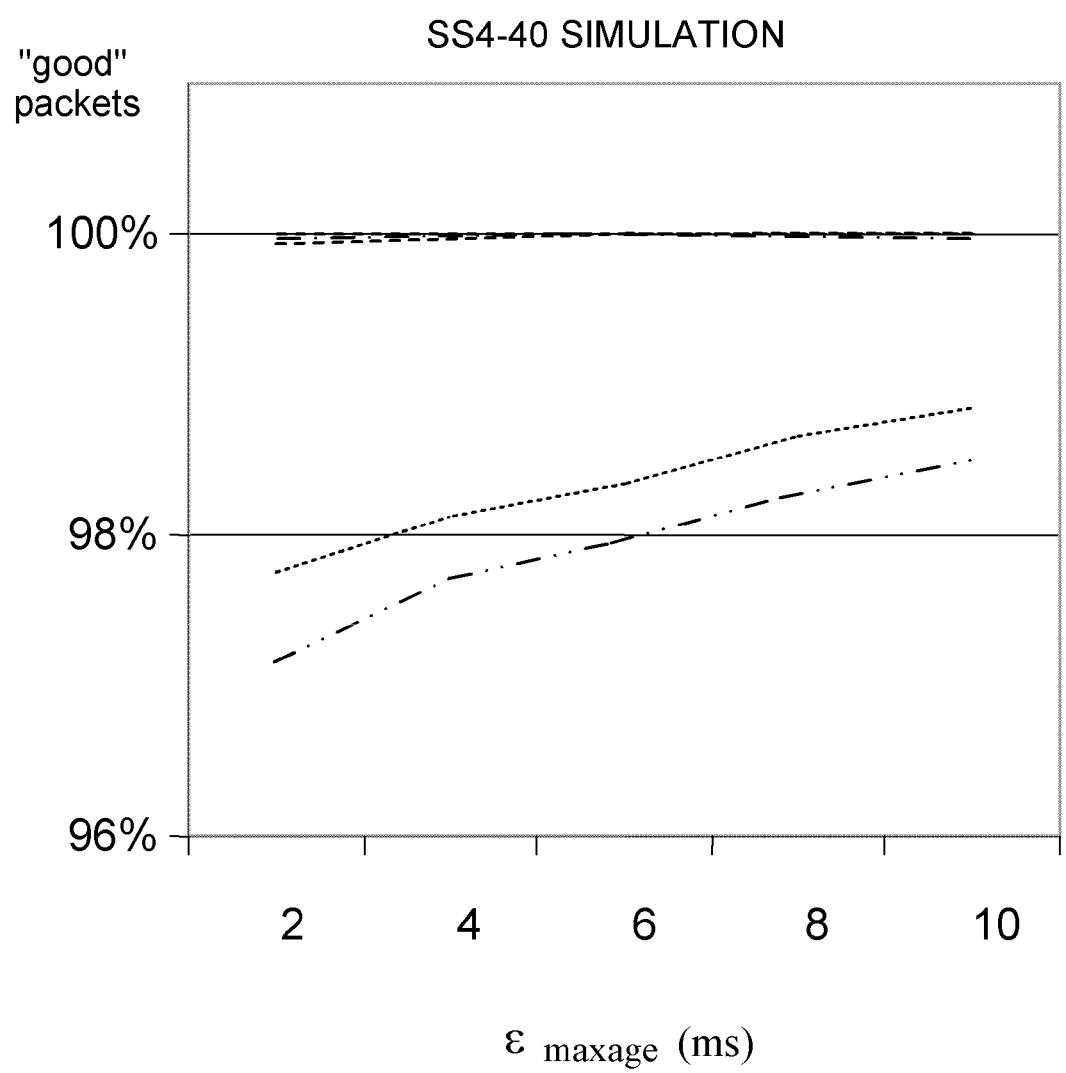
FIG. 22 shows the percentage of data packets that make their deadline requirements for another simulation in the second set of simulations of FIG. 15.
Figure 23:
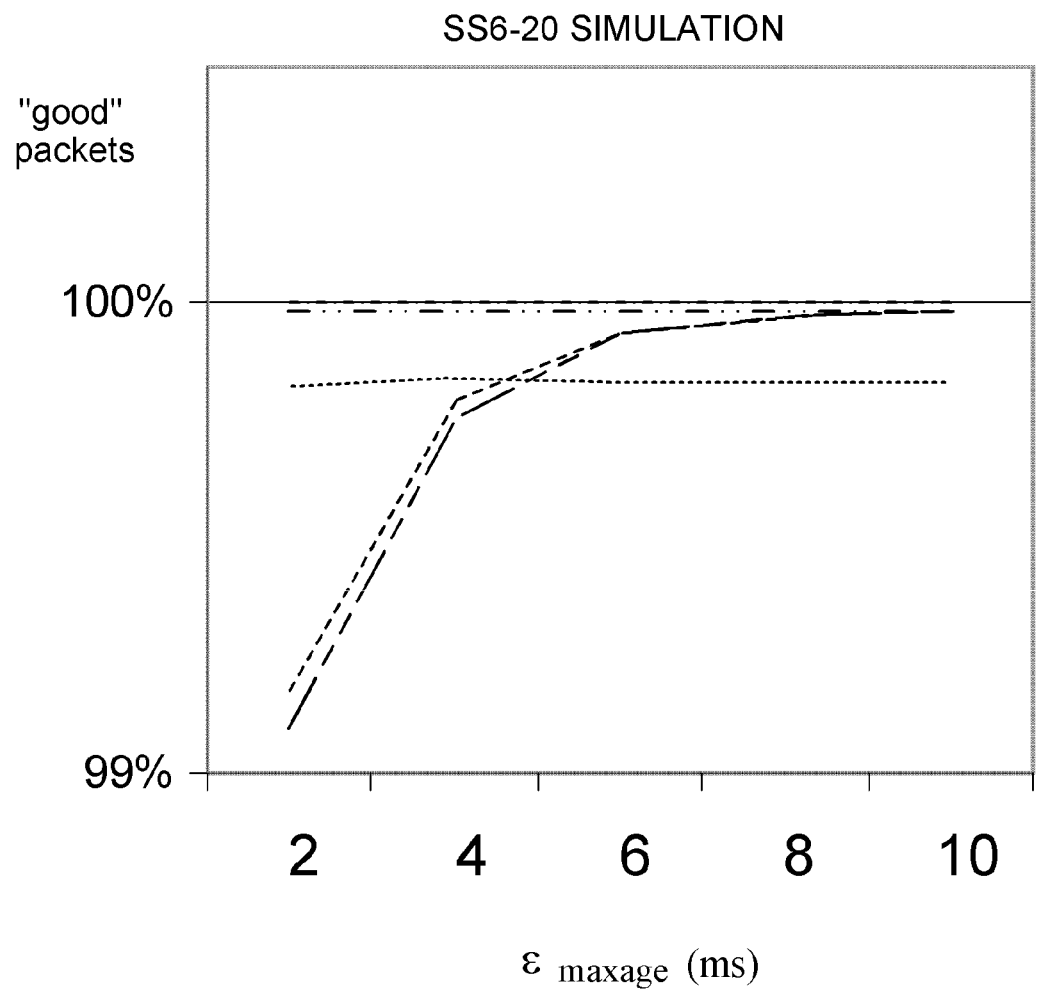
FIG. 23 shows the percentage of data packets that make their deadline requirements for one simulation in the third set of simulations of FIG. 16.
Figure 24:
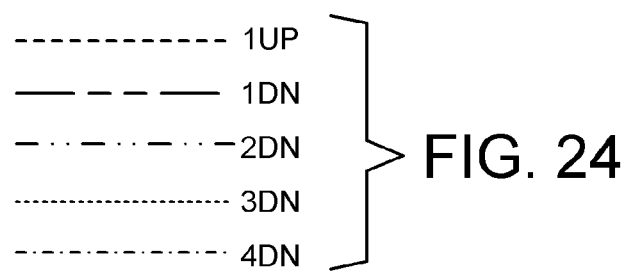
FIG. 24 identifies the various graphs in FIG. 23 and FIG. 25 in terms of uplink and downlink flows.
Figure 25:
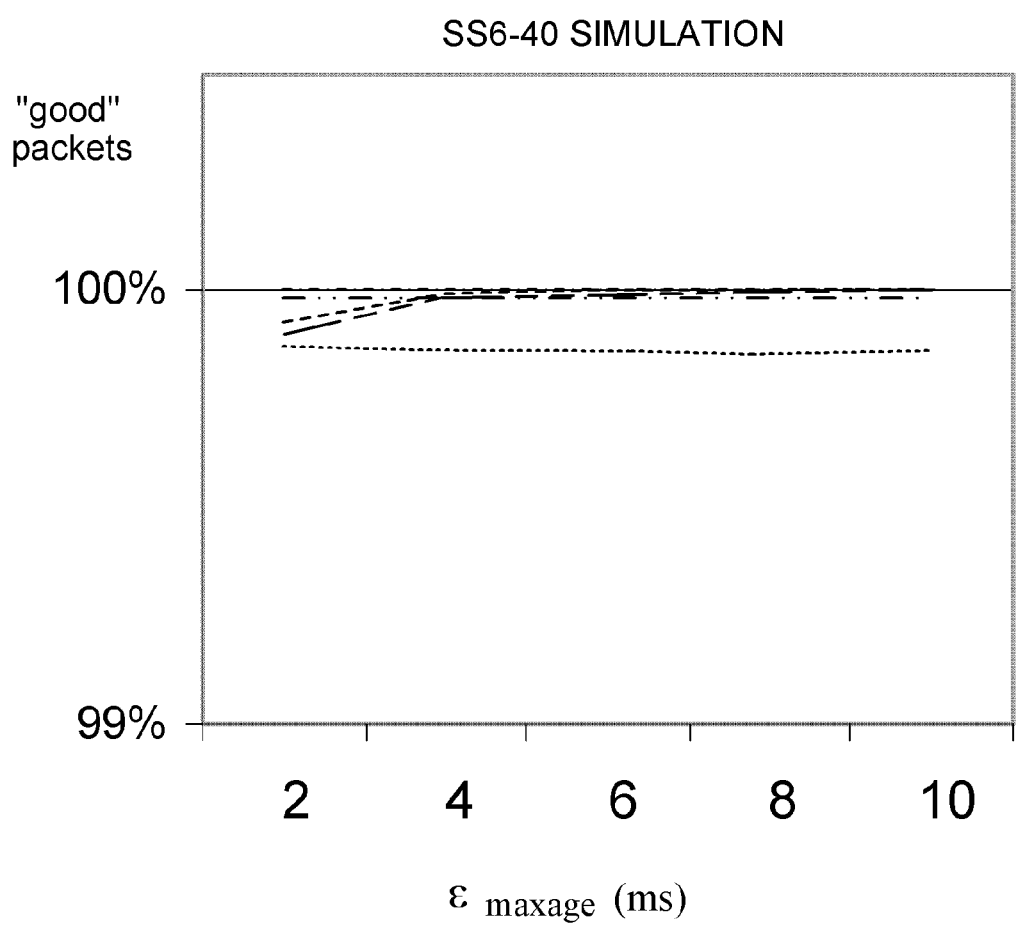
FIG. 25 shows the percentage of data packets that make their deadline requirements for another simulation in the third set of simulations of FIG. 16.

FIGS. 17 and 19 show the percent of successfully received packets for the SS1 scenario for the 20 and 40 MHz cases, respectively. FIGS. 20 and 22 show the percent of successfully received packets for the SS4 scenario for the 20 and 40 MHz cases, respectively. FIGS. 23 and 25 show the percent of successfully received packets for the SS6 scenario for the 20 and 40 MHz cases, respectively. These results show that the HCCA/Latency-Aware Service Opportunity Window-based (LASO) scheduling makes efficient use of the shared transmission medium through aggregation. The HCCA/Latency-Aware Service Opportunity Window-based (LASO) scheduling allocates an amount of time to EDCA that is close to a loose theoretical upper bound that is not achievable.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. In a wireless network having a number of stations sharing access to a wireless transmission medium, a computer-implemented method of scheduling access of traffic flows of data packets from respective packet queues for the traffic flows in the wireless stations to the wireless transmission medium, the method comprising the steps of:
    (a) for each of the traffic flows, obtaining a desired minimum age of an oldest data packet in the respective packet queue, obtaining a desired maximum age of the oldest data packet in the respective packet queue, and obtaining or estimating a time of creation of the oldest data packet in the respective packet queue, and
    (b) eliminating from consideration for immediate access to the wireless transmission medium traffic flows for which the sum of the desired minimum age of the oldest data packet in the respective packet queue and the time of creation of the oldest data packet in the respective packet queue is greater than the present time, and for traffic flows that are not eliminated from consideration for immediate access to the wireless transmission medium, granting access to the wireless transmission medium to the traffic flow having a smallest sum of the desired maximum age of the oldest data packet in the respective packet queue and the time of creation of the oldest data packet in the respective packet queue.

2. The method as claimed in claim 1, wherein the access to the wireless transmission medium that is granted, to the traffic flow having a smallest sum of the desired maximum age of the oldest data packet in the respective packet queue and the time of creation of the oldest data packet in the respective packet queue, is granted for a limited duration of time, the limited duration of time being limited to a duration of time for transmitting over the wireless transmission medium a predetermined maximum number of data packets included in a transmission block.

3. The method as claimed in claim 1, wherein the access to the wireless transmission medium that is granted, to the traffic flow having a smallest sum of the desired maximum age of the oldest data packet in the respective packet queue and the time of creation of the oldest data packet in the respective data packet queue, is granted for a limited duration of time, the limited duration of time being limited until a time at which access to the wireless transmission medium should be granted to another traffic flow to prevent said another traffic flow or any other traffic flow from missing a transmission deadline.

4. The method as claimed in claim 1, which includes increasing the desired minimum age of an oldest data packet in the respective packet queue of at least one of the traffic flows in order to increase a likelihood of aggregation of data packets of said at least one of the traffic flows for transmission together over the wireless transmission medium.

5. The method as claimed in claim 1, which includes decreasing the desired maximum age of an oldest data packet in the respective packet queue of at least one of the traffic flows in order to decrease the likelihood that said at least one of the traffic flows will miss a transmission deadline.

6. The method as claimed in claim 1, wherein the wireless network includes a number of user stations and an access point station for linking the wireless network to a wireline network, and wherein the method includes the access point station determining or estimating the time of creation of an oldest data packet in a packet queue of a user station by receiving from the user station a packet count and computing the time of creation of an oldest data packet in the packet queue of the user station from the packet count and a rate at which data packets are received in the packet queue of the user station.

7. The method as claimed in claim 1, wherein the wireless network includes a number of user stations and an access point station for linking the wireless network to a wireline network, and wherein the method includes the access point station obtaining the desired minimum age of an oldest data packet in the respective packet queue of at least one traffic flow by estimating a number of packets that will arrive in the respective packet queue of said at least one traffic flow during a delay period of the traffic flow, and computing the time required to transmit over the wireless transmission medium the estimated number of packets that will arrive in the respective packet queue of said at least one traffic flow during the delay period of said at least one traffic flow.

8. The method as claimed in claim 7, which further includes the access point station limiting the estimated number of packets that will arrive in the respective packet queue of said at least one traffic flow during a delay period of said at least one traffic flow to no more than a predetermined maximum number of data packets included in a transmission block.

9. The method as claimed in claim 1, wherein the wireless network includes a number of user stations and an access point station for linking the wireless network to a wireline network, and wherein the method includes the access point station obtaining the desired maximum age of the oldest data packet in the respective packet queue of at least one traffic flow by estimating a number of packets that will arrive in the respective packet queue of said at least one traffic flow during a delay period of the traffic flow, and computing a difference between a delay threshold for said at least one traffic flow and the time required to transmit over the wireless transmission medium the estimated number of packets that will arrive in the respective packet queue of said at least one traffic flow during the delay period of the traffic flow.

10. The method as claimed in claim 9, which further includes the access point station limiting the estimated number of packets that will arrive in the respective packet queue of said at least one traffic flow during a delay period of said at least one traffic flow to no more than a predetermined maximum number of data packets included in a transmission block.

11. In a wireless network having a number of stations sharing access to a wireless transmission medium, a computer-implemented method of scheduling access of traffic flows of data packets from respective packet queues for the traffic flows in the wireless stations to the wireless transmission medium in accordance with Hybrid Controlled Channel Access (HCCA) and Enhanced Distributed Channel Access (EDCA), the method comprising the steps of:
(a) applying HCCA by eliminating from consideration for HCCA access to the wireless transmission medium traffic flows for which the sum of a desired minimum age of an oldest data packet in the respective packet data queue and the time of creation of the oldest data packet in the respective packet queue is greater than the present time, and for traffic flows that are not eliminated from consideration for HCCA access to the wireless transmission medium, granting HCCA access to the wireless transmission medium to the traffic flow having a smallest sum of the desired maximum age of the oldest data packet in the respective packet queue and the time of creation of the oldest data packet in the respective packet queue, and
(b) when all traffic flows are eliminated from consideration for HCCA access to the wireless transmission medium, applying EDCA so that traffic flows compete for access to the wireless transmission medium.

12. The method as claimed in claim 11, in which control of access to the wireless transmission medium is returned from EDCA to HCCA when a new traffic flow enters station in the wireless network.

13. The method as claimed in claim 11, in which control of access to the wireless transmission medium is returned from EDCA to HCCA when for at least one of the traffic flows, the sum of a desired minimum age of an oldest data packet in the respective packet queue and the time of creation of the oldest data packet in the respective packet queue is no longer greater than the present time.

14. The method as claimed in claim 11, wherein the HCCA access to the wireless transmission medium that is granted, to the traffic flow having a smallest sum of the desired maximum age of the oldest data packet in the respective packet queue and the time of creation of the oldest data packet in the respective packet queue, is granted for a limited duration of time, the limited duration of time being limited to a duration of time for transmitting over the wireless transmission medium a predetermined maximum number of data packets included in a transmission block.

15. The method as claimed in claim 11, wherein the HCCA access to the wireless transmission medium that is granted, to the traffic flow having a smallest sum of the desired maximum age of the oldest data packet in the respective packet queue and the time of creation of the oldest data packet in the respective packet queue, is granted for a limited duration of time, the limited duration of time being limited until a time at which access to the wireless transmission medium should be granted to another traffic flow to prevent said another traffic flow from missing a transmission deadline.

16. An access point station for a wireless network having a number of user stations sharing access to a wireless transmission medium, the access point station comprising:
a network interface for linking the access point station to a wireline network;
a wireless transceiver for wireless communication with the user stations; and
at least one processor programmed for scheduling access of traffic flows of data packets from respective packet queues for the traffic flows in the wireless stations to the wireless transmission medium in accordance with Hybrid Controlled Channel Access (HCCA) and Enhanced Distributed Channel Access (EDCA);
wherein said at least one processor is programmed for:
(a) applying HCCA by eliminating from consideration for HCCA access to the wireless transmission medium traffic flows for which the sum of a desired minimum age of an oldest data packet in the respective packet queue and the time of creation of the oldest data packet in the respective packet queue is greater than the present time, and for traffic flows that are not eliminated from consideration for HCCA access to the wireless transmission medium, granting HCCA access to the wireless transmission medium to the traffic flow having a smallest sum of the desired maximum age of the oldest data packet in the respective packet queue and the time of creation of the oldest data packet in the respective packet queue, and (b) when all traffic flows are eliminated from consideration for HCCA access to the wireless transmission medium, applying EDCA so that traffic flows compete for access to the wireless transmission medium.

17. The access point station as claimed in claim 16, in which said at least one processor is programmed to return control of access to the wireless transmission medium from EDCA to HCCA when a new traffic flow enters a station in the wireless network.

18. The access point station as claimed in claim 16, in which said at least one processor is programmed to return control of access to the wireless transmission medium from EDCA to HCCA when for at least one of the traffic flows, the sum of a desired minimum age of an oldest data packet in the respective packet queue and the time of creation of the oldest data packet in the respective packet queue and the time of creation of the oldest data packet in the respective packet queue is no longer greater than the present time.

19. The access point station as claimed in claim 16, wherein said at least one processor is programmed so that the HCCA access to the wireless transmission medium that is granted, to the traffic flow having a smallest sum of the desired maximum age of the oldest data packet in the respective packet queue and the time of creation of the oldest data packet in the respective packet queue, is granted for a limited duration of time, the limited duration of time being limited to a duration of time for transmitting over the wireless transmission medium a predetermined maximum number of data packets included in a transmission block.

20. The method as claimed in claim 16, wherein said at least one processor is programmed so that the HCCA access to the wireless transmission medium that is granted, to the traffic flow having a smallest sum of the desired maximum age of the oldest data packet in the respective packet queue and the time of creation of the oldest data packet in the respective packet queue, is granted for a limited duration of time, the limited duration of time being limited until a time at which access to the wireless transmission medium should be granted to another traffic flow to prevent said another traffic flow from missing a transmission deadline.

* * * * *

UNITED STATES PATENT AND TRADEMARK OFFICE
CERTIFICATE OF CORRECTION

PATENT NO. : 7,463,892 B2  
APPLICATION NO. : 11/161709  
DATED : December 9, 2008  
INVENTOR(S) : Martin Eiger, Moncef Elaoud and Raquel Morera It is certified that error appears in the above-identified patent and that said Letters Patent is hereby corrected as shown below:

On the Title Page of the patent, at (73) Assignees, correct "Telcordia Research Associates, Inc.," to --Telcordia Technologies, Inc.,--

Signed and Sealed this

Eighth Day of December, 2009

David J. Kappos  
*Director of the United States Patent and Trademark Office*

UNITED STATES PATENT AND TRADEMARK OFFICE
CERTIFICATE OF CORRECTION

| | |
|---|---|
| PATENT NO. | : 7,463,892 B2 |
| APPLICATION NO. | : 11/161709 |
| DATED | : December 9, 2008 |
| INVENTOR(S) | : Eiger et al. |

It is certified that error appears in the above-identified patent and that said Letters Patent is hereby corrected as shown below:

On the Title Page, in Item (56), under "OTHER PUBLICATIONS", in Column 2, Line 3, delete "Wireless Comuunications," and insert -- Wireless Communications, --, therefor.

In the Drawings

In Fig. 6, Sheet 5 of 16, for Tag "91", in Line 5, delete "MANXIMUM" and insert -- MAXIMUM --, therefor.

In the Specification

In Column 6, Line 13, delete "if tin" and insert -- if t in --, therefor.

In Column 6, Line 24, delete "manage≦maxage in all cases. manage" and insert -- minage≦maxage in all cases. minage --, therefor.

In Column 6, Line 30, delete "and manage" and insert -- and minage --, therefor.

In Column 8, Line 7, delete "manage and" and insert -- minage and --, therefor.

In Column 8, Line 13, delete "manage and" and insert -- minage and --, therefor.

In Column 8, Line 16, delete "compute manage" and insert -- compute minage --, therefor.

In Column 8, Line 22, delete "manage is" and insert -- minage is --, therefor.

In Column 8, Line 24, delete "manage;" and insert -- minage; --, therefor.

Signed and Sealed this
Ninth Day of December, 2014

Michelle K. Lee
*Deputy Director of the United States Patent and Trademark Office*

CERTIFICATE OF CORRECTION (continued)
U.S. Pat. No. 7,463,892 B2

In Column 9, Line 60, delete "reduces tdto" and insert -- reduces td to --, therefor.

In the Claims

In Column 22, Line 9, in Claim 20, delete "The method as claimed" and insert -- The access point as claimed --, therefor.